United States Patent [19]
Beck et al.

[11] Patent Number: 5,341,783
[45] Date of Patent: * Aug. 30, 1994

[54] ACCUMULATOR FUEL INJECTION SYSTEM

[75] Inventors: Niels J. Beck, Bonita; James A. Pena, Solana Beach; Alan R. Roach, Del Mar; Bevan H. Johnston, La Mesa, all of Calif.

[73] Assignee: Servojet Electronic Systems, Ltd., San Diego, Calif.

[*] Notice: The portion of the term of this patent subsequent to Jun. 1, 2010 has been disclaimed.

[21] Appl. No.: 117,393

[22] Filed: Sep. 3, 1993

Related U.S. Application Data

[63] Continuation of Ser. No. 830,981, Jan. 28, 1992, Pat. No. 5,241,935, which is a continuation of Ser. No. 152,013, Feb. 3, 1988.

[51] Int. Cl.$^5$ ............................................. F02M 37/04
[52] U.S. Cl. ................................. 123/446; 123/467; 123/300
[58] Field of Search ................ 123/300, 299, 446, 447, 123/467

[56] References Cited

U.S. PATENT DOCUMENTS

| | | |
|---|---|---|
| 1,735,718 | 11/1929 | Attendu . |
| 4,168,804 | 9/1979 | Hofmann . |
| 4,284,043 | 8/1981 | Happel . |
| 4,548,172 | 10/1985 | Bailey . |
| 4,704,999 | 11/1987 | Hashikawa . |
| 4,715,541 | 8/1991 | Freudenschuss . |
| 5,241,935 | 9/1993 | Beck ................... 123/300 |

FOREIGN PATENT DOCUMENTS 972143 9/1948 France .

Primary Examiner—Carl S. Miller
Attorney, Agent, or Firm—Nilles & Nilles

[57] ABSTRACT

A series of method and apparatus advances in the accumulator-type fuel injector art, applicable to both intensified and unintensified accumulator injectors, which cooperate to provide major improvements in internal combustion engine fuel economy, reduction of noise, and reduction of undesirable exhaust emissions, including smoke, oxides of nitrogen and hydrocarbons. According to the invention, injector needle closure speed is increased for sharper fuel cutoff and better atomization proximate closure, and needle closure bounce is minimized to minimize fuel dribble proximate closure by reducing both mass and length of the needle, which can be accomplished by a longitudinally divided needle. Hydraulic damping also damps and cushions both needle closing and needle opening. The accumulator cavity and needle spring cavity are separated, enabling the accumulator cavity to be as small as desired for high accumulator closing pressure, while nevertheless enabling a strong, fast-acting spring to be used, both factors cumulatively contributing to good closure atomization. A two-stage needle lift is provided for first injecting a pilot fuel charge for preignition, and then injecting the main fuel charge, thereby eliminating the usual adverse premixed burning. The injection spray pattern is automatically varied for improved engine efficiency over the engine power spectrum by utilizing a pintle-type injector nozzle which is variably controlled according to the quantity of fuel delivered.

34 Claims, 8 Drawing Sheets

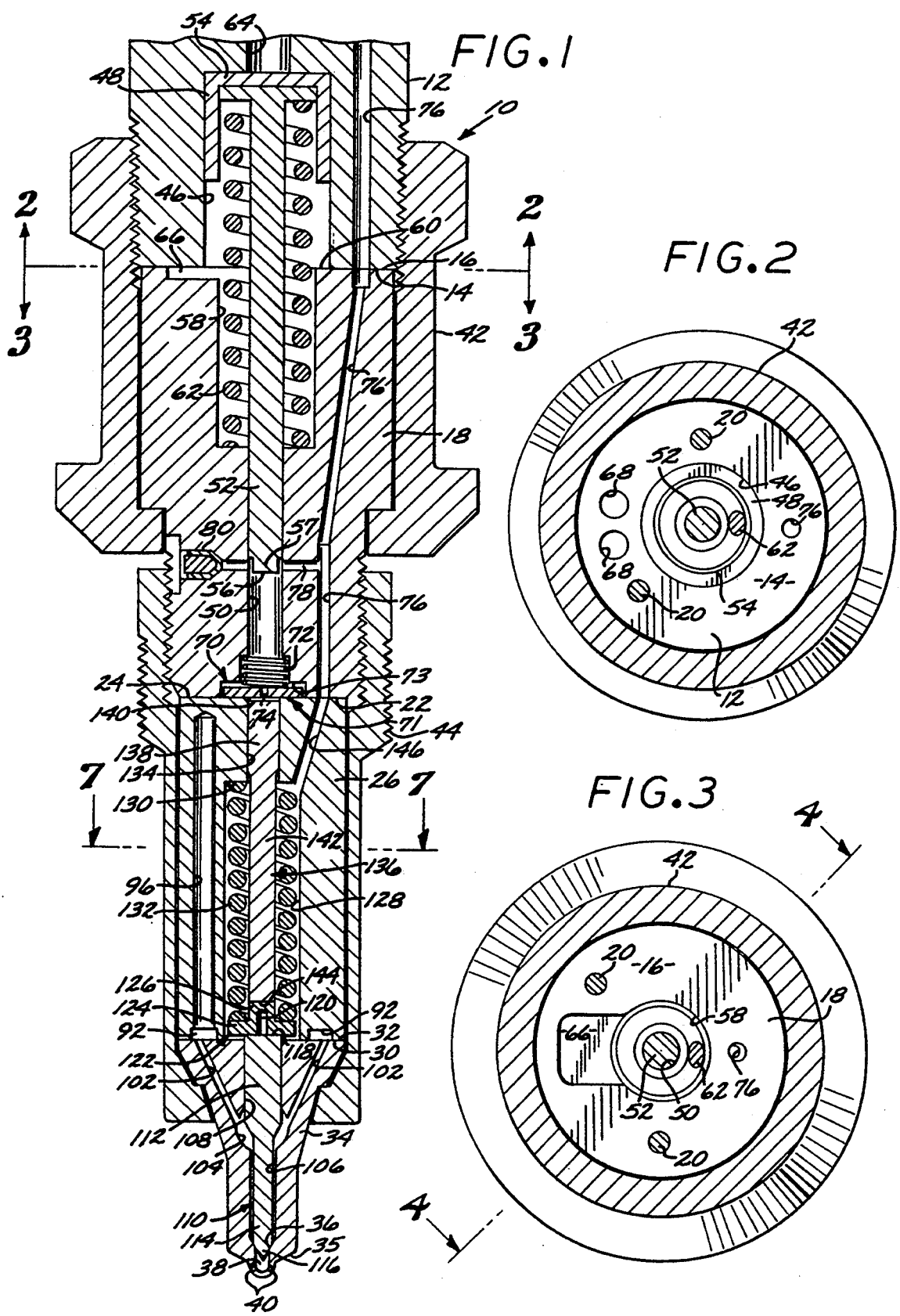

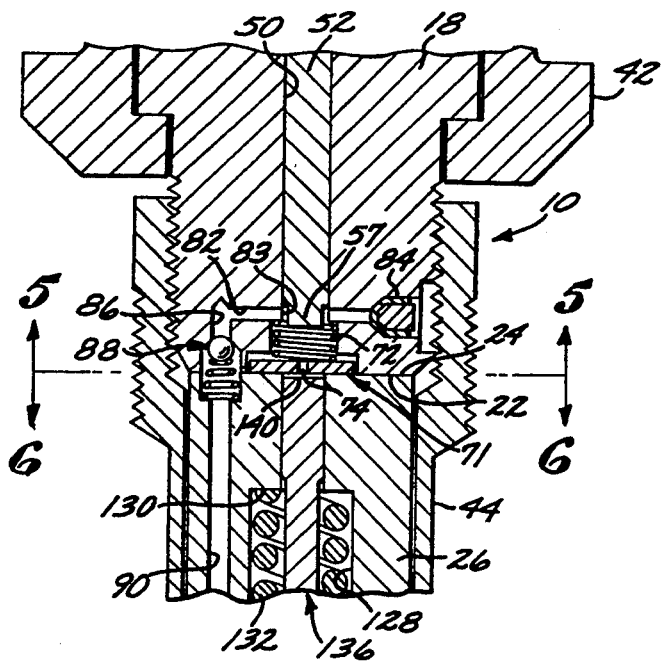
FIG. 4
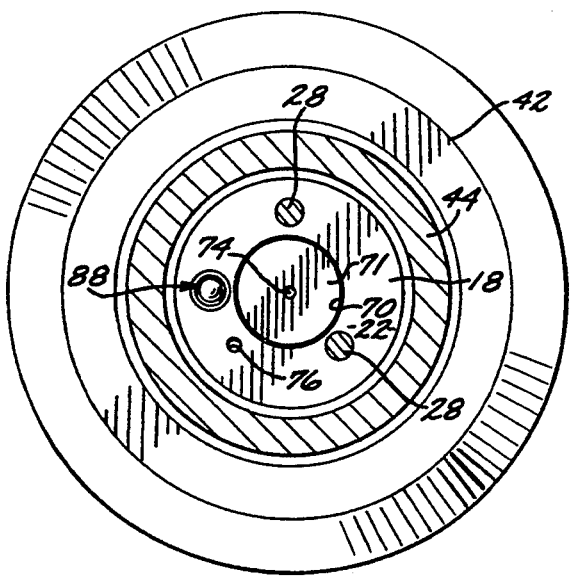
FIG. 5
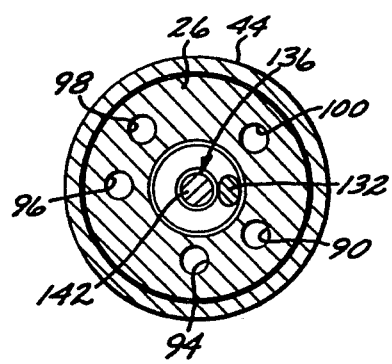
FIG. 6
FIG. 7

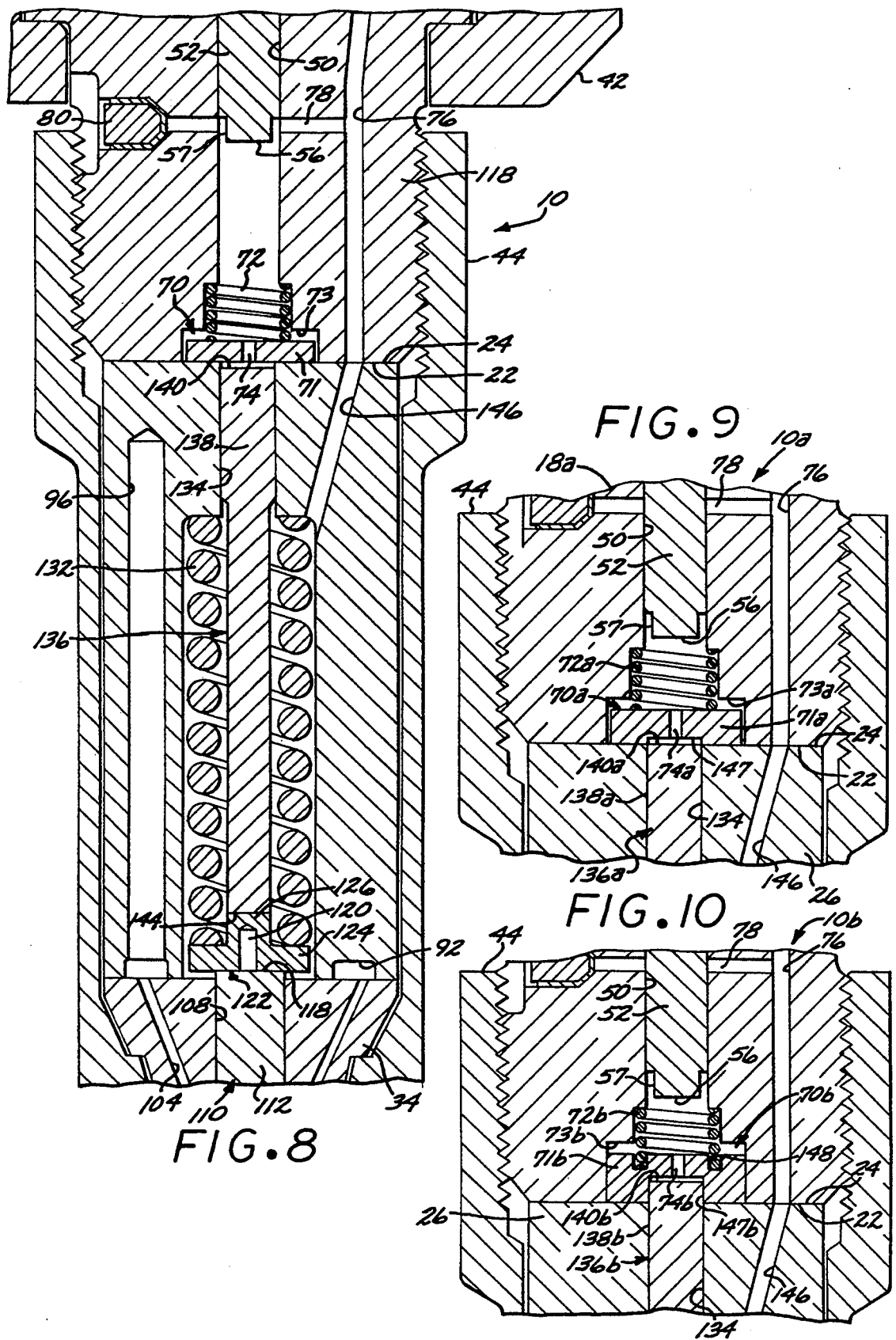

ACCUMULATOR FUEL INJECTION SYSTEM

This application is a continuation of application Ser. No. 07/830,981, filed Jan. 28, 1993, now U.S. Pat. No. 5,241,935 which is a continuation of prior application Ser. No. 07/152,013, filed on Feb. 3, 1988.

BACKGROUND OF THE INVENTION

1. Field of the Invention

The present invention relates to fuel injectors for internal combustion engines, and particularly to improvements in accumulator-type fuel injectors, including both unintensified and intensified accumulator injectors, which produce improved fuel economy, noise reduction, and reduction of undesirable exhaust emissions, including smoke, oxides of nitrogen, and hydrocarbons.

2. Description of the Prior Art

Accumulator-type fuel injectors have been known in the art for many years, but never have achieved widespread use. It is believed this is because they have heretofore not solved problems present in conventional injectors, and have even introduced additional problems which have been inherent in prior art forms of accumulator injectors.

One serious problem with both conventional fuel injectors and prior art accumulator-type fuel injectors has been premixed burning of the fuel. Typically, about 25-50 percent of the total quantity of fuel injected will be atomized and mixed with air prior to the start of combustion. The sudden combustion of this premixed fuel causes a rapid rate of heat release at the beginning of ignition, with a resulting excessively high noise level, and undesirable exhaust emissions including smoke, oxides of nitrogen, and hydrocarbon emissions. One answer to this problem is to provide a two-stage injection, with a small pilot charge of fuel first injected and ignited, and then the main charge of fuel injected and immediately ignited by the already ignited pilot charge. A system of this type is taught in Loyd U.S. Pat. No. 4,414,940. Although the Loyd system does solve the problem, it requires two separate injectors, one for the pilot charge and another for the main charge, making the system undesirably complicated and expensive.

Another problem with both conventional fuel injectors and prior art accumulator-type fuel injectors is that they produce a fixed spray pattern regardless of engine power demands, and this necessarily compromises engine efficiency at some power settings. For optimum overall engine efficiency, it would be desirable to tailor the spray configuration variably according to the power demands of the engine by having a relatively wide, flat conical spray configuration at relatively low fuel delivery, such as during engine idle, and to have the cone of the spray narrow progressively as the power setting is progressively increased.

The injector needle closure event has been characteristically unsatisfactory in prior art accumulator-type injectors. Typically, atomization of the fuel has been poor as the needle approaches the seat. Rapid needle closure is required to keep atomization good during the closing event, but the required high speed needle movement has caused needle bounce off of the seat, resulting in secondary and sometimes tertiary injection events, with essentially unatomized fuel dribble being the further result. Both poor atomization and fuel dribble associated with needle closing results in undesirable smoke and high hydrocarbon levels in the exhaust. Prior art accumulator needles have been characteristically long and massive, and if closed at high speed, considerable elastic compressional energy builds up along their lengths upon striking the valve seat, and when this energy is released it causes the needle to bounce off the seat. Examples of accumulator injector needles which are thus undesirably long and massive are found in Falberg U.S. Pat. Nos. 2,985,378, Berchtold 4,566,416, Loyd 4,414,940, Beck et al. 4,628,881, Vincent et al. 4,080,942, and in a 1957 publication by Hooker in the Volume 65, 1957 issue of "SAE Transactions," illustrated at page 317. The typical accumulator injector needle mass is on the order of about six grams or more, and with this much mass the energy of momentum of a fast-closing needle is generally too much to avoid needle bounce.

While a short, very lightweight needle is desirable to minimize needle bounce, needle closure damping associated with such short, lightweight needle is also desirable to positively preclude needle bounce in a high speed needle closing event. Applicants are not aware of such closure damping having been addressed in the prior art. It is believed that this is because the prior art has not sought to cure the problem of poor atomization proximate needle closure by means of a high speed needle closing event.

In order to maintain good atomization right up to needle closure, it is also necessary to have a high closing accumulator pressure, and this in turn requires high peak pressure and high average pressure in the accumulator cavity to get the required injection quantity at high power settings. A relatively small accumulator cavity is required for high accumulator pressures. Conventional accumulator injector practice has been to have the accumulator cavity coaxially disposed around the needle, with the needle closure spring disposed within the accumulator cavity. In general, this results in accumulator cavities which are too large for a high pressure accumulator, particularly with the very high pressure in an intensified-type accumulator injector such as that disclosed in the aforesaid Beck et al. U.S. Pat. No. 4,628,881. With the spring located in the accumulator cavity, the only way to reduce the volume of the cavity would be to reduce the size of the spring, and this is just the opposite of what is required for high speed needle closure, namely, a large, strong closure spring. This conventional arrangement with the needle spring concentrically located within the accumulator cavity is seen in Falberg U.S. Pat. Nos. 2,985,378, Berchtold 4,566,416, Loyd 4,414,940, Beck et al. 4,628,881, and the aforesaid Hooker publication. Vincent et al. U.S. Pat. No. 4,080,942 has the needle spring located in a control chamber which receives pressurized fluid for holding the needle down, but this has resulted in the main accumulator chamber being spaced coaxially above the control chamber, a cumbersome arrangement which could not possibly be used in an intensified form of accumulator injector such as that disclosed in the Beck et al. Pat. No. 4,628,881. For a practical and compact accumulator fuel injector, the accumulator cavity should be arranged closely proximate the spring cavity within a lower portion of the injector, and generally concentrically and thereby compactly-oriented about the spring cavity. This is the only feasible location for the accumulator cavity in an intensified form of accumulator injector.

Pintle spray nozzles having frustoconical deflecting surfaces are known in the fuel injector art, and are common in garden hose nozzles. In hose nozzles, the angle of the spray is manually adjustable by axial movement of the pintle head relative to the orifice. However, no such adjustability has heretofore been known in the fuel injector art, even though automatic adjustment of the spray cone angle to tailor the spray to engine power demands could produce substantial increases in efficiency over the engine power spectrum.

SUMMARY OF THE INVENTION

In view of these and other problems in the art, it is a general object of the present invention to provide a fuel injector for internal combustion engines which produces reduced noise levels and reduction of undesirable exhaust emissions, including smoke, oxides of nitrogen and hydrocarbons.

Another object of the invention is to provide an improved fuel injector for internal combustion engines which substantially eliminates premixed burning and its adverse effects of noise and undesirable exhaust emissions.

Another object of the invention is to provide a simplified two-stage injection system for first injecting a small pilot or initial charge of fuel which is ignited before injection of the main charge, and then injecting the main charge of fuel which is immediately ignited by the already ignited pilot charge, for elimination of the usual large amount of premixed burning and its adverse effects, the system requiring only a single injector.

Another object of the invention is to provide a fuel injector system which tailors the injection spray configuration variably according to the power demands of the engine for improved efficiency over the full range of power settings, delivering the injected fuel in a relatively wide, flat conical spray configuration at relatively low engine power settings, such as during engine idle, with the cone of the spray narrowing progressively as the power setting is progressively increased.

Another object of the invention is to provide a fuel injector which has a high pressure, high speed needle closing event without material needle bounce and associated secondary and possibly tertiary injections proximate closure, resulting in good atomization right up to closure and substantial elimination of fuel dribble.

Another object of the invention is to provide, in an accumulator-type fuel injector, a needle which is particularly short and light in weight so that it can be moved rapidly in the needle closing event for sharp fuel cutoff, while at the same time it will store only minimal elastic compressional energy when it impacts the valve seat, with resulting minimization of needle closure bounce.

Another object of the invention is to provide, in an accumulator-type fuel injector, a needle closure damper for effectively damping the end of the needle closing event, for positively precluding needle closure bounce.

A further object of the invention is to provide, in an accumulator-type injector, a needle closure damper which is remote from the needle tip and valve seat, thereby permitting efficient shaping of the needle tip and valve seat for a high flow coefficient as the needle approaches the seat during closure, maintaining high pressure proximate the seat with resulting good atomization up to closure.

A further object of the invention is to provide, in an accumulator-type injector, an accumulator cavity which is separate and isolated from the needle spring cavity yet is compactly arranged closely proximate the spring cavity within a lower portion of the injector, enabling a large, high speed needle spring to be employed, while at the same time enabling the accumulator cavity to be as small as desired for high pressure accumulator operation, both of which are important factors in achieving fast, crisp needle closure with good fuel atomization and minimum fuel dribble proximate closure.

A further object of the invention is to provide, in an accumulator-type injector, a two-part needle comprising a lower part which engages the valve seat and an upper plunger part which engages the needle during the needle opening event to slow down the opening as a damping factor, but separates from the needle during the needle closing event to minimize needle length and mass for high speed needle closure with minimum bounce from stored elastic compressional energy.

A further object of the invention is to provide, in an accumulator-type injector, novel needle opening stop devices which stop the needle at a small initial "prelift" or "low-lift" increment of lift for a small pilot or initial injection, and then release the needle to its full lift for injection of the main charge.

A further object of the invention is to provide methods for controlling the time interval during which the needle remains in the small prelift or low-lift position for injection of the pilot charge, including adjustably orificing the needle opening vent passage, and adjusting the vent pressure level.

A still further object of the invention is to provide hydraulic circuitry for producing and controlling the time duration of the needle prelift, including a positive stop arrangement associated with such hydraulic circuitry for defining the amount of needle prelift.

Yet a further object of the invention is to provide a novel pintle nozzle arrangement which makes use of the fact that in an accumulator-type injector needle lift is generally proportional to the difference between the accumulator-pressures and closing pressures, and hence also to fuel delivery volume, to automatically tailor the cone angle of the spray according to engine power demands, thereby substantially increasing efficiency over the engine power spectrum.

An additional object of the invention is to improve the flow coefficient proximate the needle tip and seat in an accumulator-type injector by axially guiding the needle closer to the seat for improved repeatability of centering of the needle on the seat upon needle closure, thereby enabling higher closure pressures and consequent better fuel atomization proximate closure.

The present invention provides a series of both method and apparatus advances in the accumulator-type fuel injector art, each of which produces improved engine performance, and when some or all are combined, synergistically produce surprisingly large improvements in engine fuel economy, reduction of noise, and reduction of undesirable exhaust emissions, including smoke, oxides of nitrogen and hydrocarbons. The invention is applicable to both intensified accumulator injectors of the general type disclosed in the aforesaid Beck et al. patent, and unintensified accumulators of the general type disclosed in the aforesaid Beck et al., Falberg, Berchtold and Vincent et al. patents, and Hooker publication.

According to the invention, injector needle closure speed is increased for sharper fuel cutoff and hence better atomization proximate closure, while at the same time needle bounce off of the valve seat is reduced, to minimize secondary and sometimes tertiary injection events and consequent fuel dribble, by reducing both the mass and the length of the needle. In a preferred form of the invention, reduction of both the closing mass and closing length of the needle is accomplished by dividing the needle longitudinally into a pair of longitudinal sections, a lower needle section and an upper plunger section, which act as a unit during the needle opening stroke, but separate during the closing stroke so that a lower needle section of greatly reduced mass and length operates independently during needle closure.

Needle bounce is also reduced according to the invention by means of hydraulic damping which cushions the end of the needle closure stroke. This is accomplished by providing a damper member that is coupled to the upper end of the needle, or to the upper end of the lower needle portion in the case of the divided needle, located in a fluid-filled cavity, with close-tolerance spacing both peripherally between the damper member and the wall of the cavity and axially under the damper member. The resulting constriction against passage of fluid from under the damper member past the periphery of the damper member produces a hydraulic "squish damping" effect proximate needle closure. The low mass of the needle cooperates with this hydraulic damping in minimization of needle bounce. Preferably, this closure damping cavity is remote from the needle tip and seat, permitting efficient shaping of the needle tip and valve seat for a high flow coefficient and resulting good atomization proximate closure. In preferred forms of the invention, this closure damping cavity is also the needle spring cavity which is separate and isolated from the accumulator cavity.

The end of the opening stroke of the needle is also preferably damped according to the invention. This is accomplished by providing a damper cavity just above the upper end of the needle, or in the case of the divided needle, just above the upper end of the upper plunger section. A needle stop and damping plate is located in the damper cavity, having close-tolerance peripheral spacing relative to the wall of the cavity. The cavity has a downwardly facing shoulder against which the upper end of the needle or plunger moves the stop/damping plate to define the fully open needle position, and hydraulic squish damping occurs by constricted flow of fluid around the periphery of the plate and between the plate and this stop shoulder. The opening stroke of the needle may be further slowed down or damped by adding mass to the needle during the opening stroke. This is accomplished by employing the divided needle arrangement referred to above which adds the mass of the plunger to the mass of the needle during the opening stroke, while leaving the plunger behind and removing its mass for the closing stroke.

The accumulator cavity is separated from the needle spring cavity according to the present invention. This enables the accumulator cavity to be made as small as desired for high pressure accumulator operation, while at the same time enabling use of a strong, fast-acting spring for rapid needle closure. Both high accumulator pressure, which enables high closing pressure, and a strong spring for causing fast needle closure are factors which cumulatively contribute to good closure atomization. The spring cavity is coaxial of the needle, while the accumulator cavity is spaced radially outwardly from the spring cavity in a lower portion of the injector, which is an optimal location for the accumulator cavity in the intensified forms, of the invention. The higher the accumulator cavity pressure, the smaller the accumulator cavity must be for the same quantity of fuel injected. To accommodate very high accumulator cavity pressures in the intensified form of the invention, the accumulator cavity comprises a plurality of generally parallel accumulator bores peripherally spaced about the spring cavity.

Preferred forms of the present invention embody a two-stage needle lift for first injecting a small pilot charge of fuel which is ignited before injection of the main charge, and then injecting the main charge of fuel which is immediately ignited by the already ignited pilot charge. This eliminates the usual amount of premixed burning and its adverse effects of large noise levels and large levels of undesirable exhaust emissions. The initial needle prelift or low-lift stage may be from about 1 to about 20 percent of maximum needle lift, and the pilot charge is preferably on the order of about 2–20 percent of the full charge.

In some forms of the invention, this two-stage needle lift is accomplished by utilizing a two-stage venting of pressure from above the opening stop/damping plate referred to above to first stop the needle at the prelift position, and then after a sufficient interval of time for injection of the pilot charge, release the needle to move further upwardly for full injection of the main charge.

In other forms of the invention, the two-stage needle lift is accomplished by hydraulic circuits which provide two-stage venting of pressurized fuel from above the needle so as to cause a first low-lift increment of movement of the injector needle, and then in sequence the full lift movement of the needle.

The various two-stage lift forms of the invention are shown and described in connection with intensified forms of the invention, applying the two-stage venting to the low pressure intensifier cylinder so as to control the pressure in the high pressure cylinder. However, such two-stage venting to control the two-stage lift is equally applicable to unintensified forms of the invention, with the venting being from directly above the needle.

The injection spray pattern or configuration may be automatically varied for improved engine efficiency over the engine power spectrum by utilizing a pintle nozzle which is variably controlled according to the quantity of fuel delivered. Use is made of the fact that in an accumulator injector the needle lift is momentarily generally proportional to the difference between opening and closing pressures, and hence also to fuel delivery volume. The pintle nozzle is arranged to deliver a relatively wide, flat cone of spray for low engine power settings, such as at idle, and a narrowing cone of spray for increasing power settings.

A further feature of both the intensified and unintensified forms of the invention is that the needle is axially guided very close to the valve seat, which provides reliable repeatability of needle centering on the seat over a long operational life of the injectors. This enables the needle tip and seat combination to have a high flow coefficient for high pressure closure and consequent good atomization proximate closure.

BRIEF DESCRIPTION OF THE DRAWINGS

These and other objects and advantages of the invention will become more apparent from the following Detailed Description and the accompanying drawings, wherein:

FIG. 1 is an enlarged longitudinal, axial sectional view of an intensified form of the present invention, with the needle shown in the closed position;

FIG. 2 is a transverse section taken on line 2—2 of FIG. 1, looking upwardly;

FIG. 3 is a transverse section taken on line 3—3 of FIG. 1, looking downwardly;

FIG. 4 is a fragmentary longitudinal section, partly in elevation, taken on line 4—4 of FIG. 3;

FIG. 5 is a transverse section taken on line 5—5 of FIG. 4, looking upwardly;

FIG. 6 is a transverse section taken on line 6—6 of FIG. 5, looking downwardly;

FIG. 7 is a transverse section taken on line 7 of FIG. 1;

FIG. 8 is a further enlarged fragmentary longitudinal, axial section of a portion of FIG. 1, showing a first form of the opening stop plate or wafer of the invention which is employed to provide two-stage needle lift;

FIG. 9 is a view similar to a portion of FIG. 8 showing a second form of the stop plate or wafer;

FIG. 10 is a view similar to FIG. 9 showing a third form of the stop plate or wafer;

DETAILED DESCRIPTION

Intensified Form of the Invention

Figure 11:
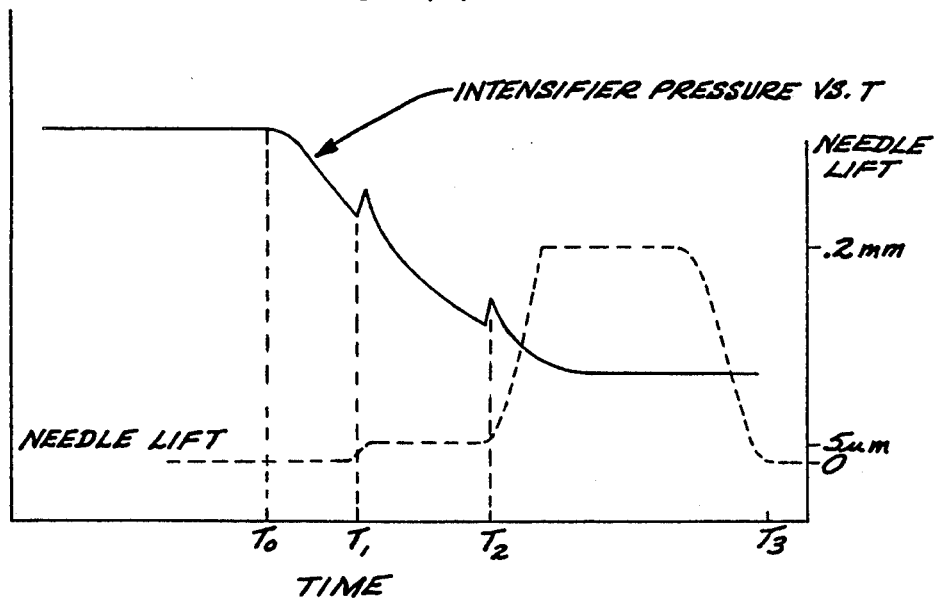
FIG. 11 is a graph or chart illustrating the two-stage needle lift of the invention.

Referring to the drawings, and at first particularly to FIGS. 1-8 thereof, these figures illustrate an "intensified" or pressure multiplication form of the present invention. The longitudinal axial sectional view of FIG. 1 best illustrates the overall assembly of this form of the invention, while the fragmentary longitudinal axial section of FIG. 4 best illustrates the high pressure fuel input to the accumulator cavity.

The intensified form of the invention has particular utility for diesel engines where high overall accumulator pressures and consequent high closing pressure enabled thereby can be beneficial as described hereinafter. Nevertheless, it is to be understood that the intensified form of the invention may also be beneficially employed for engines powered with gasoline or other liquid fuels.

The intensifier-type accumulator injector of the invention is generally designated 10. A control block 12 is disposed at the upper end of injector 10, control block 12 being in communication with a high speed solenoid actuated control valve (not shown). Such control valve may be like the valve 30 shown and described in detail in the Beck et al. U.S. Pat. No. 4,628,881, which is best illustrated in FIGS. 5a, 9 and 10 of that patent. Features which it is desirable to incorporate in the high speed solenoid actuated control valve are covered in jointly owned co-pending applications, Ser. No. 823,807 of Robert L. Barkhimer, filed Jan. 29, 1986 for High Cycle Solenoid Valve (now U.S. Pat. No. 4,997,004), and Ser. No. 830,000 of Niels J. Beck, filed Feb. 18, 1986 for Ball Poppet Valve Seat Construction.

Control block 12 is hydraulically connected to such solenoid actuated control valve in a manner similar to the hydraulic connections of the block 110 to the valve 30 in said Beck et al. '881 patent, for an overall mode of operation of the present intensified accumulator injector 10 which is essentially the same as that of the injector of FIGS. 5a, 5b, 9 and 10 of the Beck et al. '881 patent. It is to be noted that in the Beck et al. '881 patent the block 110 serves not only as the upper part of the injector but also as the main body of the valve, whereas control block 12 in the present invention may be attached to an independent valve body or otherwise hydraulically connected to the solenoid actuated valve, remotely if desired.

The flat, transverse lower end surface 14 of control block 12 is lapped to a mating flat, transverse upper end surface 16 of an intensifier body 18, control block 12 and intensifier body 18 being keyed together for correct relative orientation by a pair of locator dowels 20 which are seen in FIGS. 2 and 3. The flat, transverse lower end surface 22 of intensifier body 18 is, in turn, lapped to a flat, transverse upper end surface 24 of an accumulator body 26, intensifier body 18 and accumulator body 26 being keyed together in correct relative orientation by a pair of locator dowels 28 seen in FIGS. 5 and 6. The flat, transverse lower end surface 30 of accumulator body 26 is lapped to a flat, transverse upper end surface 32 of a nozzle body 34 which extends from upper end surface 32 to a lower end generally designated 35. Located in lower end 35 of nozzle body 34 are the injector valve seat 36, sac 38 and injection holes 40.

The control block 12 and intensifier body 18 are clamped together within an upper housing 42, intensifier body 18 being stepped so as to seat within upper housing 42, and control block 12 being threadedly coupled to upper housing 42. The accumulator body 26 and nozzle body 34 are clamped together with a lower housing 44 which is threadedly coupled to intensifier body 18.

A low pressure hydraulic cylinder 46 having a relatively large diameter bore is axially defined within control block 12, and a relatively large diameter, down-cupped low pressure piston 48 is axially slideable within cylinder 46. A coaxial high pressure hydraulic cylinder 50 having a relatively small bore is axially defined within intensifier body 18, extending down through the lower end surface 22 of intensifier body 18. A high pressure piston or plunger 52 having a relatively small diameter is axially slideable within high pressure cylinder 50. High pressure piston 52 has an upper end cap 54, shown as a flange, which seats inside the low pressure piston 48 against the top wall of the latter. High pressure piston 52 extends downwardly to a flat, transverse lower end 56, and has a reduced diameter lower end portion 57. A cylindrical spring cavity 58 is defined within intensifier body 18, opening through the upper end surface 16 of body 18 into communication with low pressure cylinder 46. Spring cavity 58 is coaxial with cylinder 46 but of smaller diameter so as to provide an upwardly facing shoulder 60 which acts as a stop for downward movement of low pressure piston 48, and consequently also high pressure piston 52 which moves axially down and up as a unit with low pressure piston 48. A piston return spring 62 is disposed within both low pressure cylinder 46 and spring cavity 58, having its lower end seated against the bottom of cavity 58 and its upper end seated against high pressure piston flange 54, biasing flange 54 against the top of low pressure piston 48 so as to effectively couple the pistons 48 and 52 together at all times.

An actuating fluid inlet and vent passage 64 extends axially through the upper portion of control block 12 into communication with low pressure cylinder 46, and provides liquid fuel into low pressure cylinder 46 to drive low pressure piston 48, and hence also high pressure piston 52, downwardly in an intensification stroke from the uppermost position of the two pistons as illustrated in FIG. 1 downwardly to an extent determined by the momentary power demand of the engine, the lowermost positions of the pistons being determined by engagement of the lower lip of low pressure piston 48 against stop shoulder 60. The lowermost position of high pressure piston 52 is the position illustrated in FIG. 4.

Inlet/vent passage 64 also serves as a vent passage through which fluid is vented from low pressure cylinder 46 for initiating and controlling the timing of a small incremental prelift of the needle for injection of a small initial pilot charge, and then full lift of the needle for the main injection. Inlet/vent passage 64 preferably has variable orificing (not shown) for controlling the rate of decay of pressure in low pressure cylinder 46, and hence of the intensified pressure in high pressure cylinder 50, for adjustment of the timing of the prelift and full lift events, as described in detail hereinafter in the description of the operation of the intensified injector 10. The time duration of the prelift phase of the injection event will control the quantity of the pilot charge. Such variable venting by variable orificing or valving of passage 64 affords the opportunity to adjust the prelift portion of the injection while the engine is running by dynamic adjustment of the vent fluid flow. The rate of decay of pressure in low pressure cylinder 46, and hence of the intensified pressure in high pressure cylinder 50, may also be controlled by adjusting the pressure level in the vent line to passage 64, and this may also be done while the engine is running.

To accomplish a downward intensification stroke of pistons 48 and 52, pressurized liquid fuel is passed through inlet/vent passage 64 from the solenoid control valve referred to above at common rail pressure (i.e., regulated pump pressure). For time interval (or time duration or pulse width) fuel metering of the amount of the fuel charge to be introduced into the accumulator, this rail pressure will be the same for each piston stroke, typically on the order of about 1,500 psig, but the length of the time interval during which pressurized fuel is supplied to low pressure cylinder 46 through inlet/vent passage 64 will vary from a relatively short time interval for low engine power to a relatively long time interval for high engine power. For pressure compressibility fuel metering of the fuel charge to be introduced into the accumulator, the pressure of fuel introduced into low pressure cylinder 46 through inlet/vent passage 64 will vary according to engine power demands, as for example from about 500 psig at idle to about 1,500 psig at full power.

For either such time duration fuel metering or pressure. compressability fuel metering, or a combination of both, the length of the downward intensification stroke of pistons 48 and 52 will vary according to power demand, the stroke being a relatively short stroke for a relatively low power demand, and a relatively long stroke for a relatively high power demand, with the full power, maximum stroke length being to the high pressure piston 52 position shown in dotted lines in FIG. 1 and shown in FIG. 4. The hydraulic pressure which builds up in low pressure cylinder 46 will be generally proportional to the length of the downward stroke, and the intensified pressure in high pressure cylinder 50 will be higher than the low pressure cylinder pressure in proportion to the cross-sectional area of high pressure piston 48 divided by the cross-sectional area of low pressure piston 52. A satisfactory intensification factor is on the order of about 15:1, produced by a 15:1 area ratio of low pressure piston 48 to high pressure piston 52. For example, with such a 15:1 intensification, a relatively low rail pressure of 500 psig would produce a relatively low engine power intensified pressure of 7,500 psig, while a relatively high rail pressure of 1,500 psig would produce a relatively high engine power intensified pressure of 22,500 psig.

At the engine-timed instant for initiation of an injection event, the solenoid valve shifts to a vent position in which it vents passage 64, and hence low pressure cylinder 46, to a lowered pressure, which may be essentially atmospheric pressure, which enables piston return spring 62 to move both of the pistons 48 and 52 back up to their positions of repose as illustrated in FIG. 1. The manner in-which this causes the injection event to occur will be described in detail hereinbelow.

Pressure relief from within cylinder 46 and spring cavity 58 during the intensification downstroke of the pistons is accomplished through a vent cavity 66 in the upper end of intensifier body 18 and a pair of communicating vent passages 68, seen in FIG. 2, which extend longitudinally upwardly through control block 12 and are vented to essentially atmospheric pressure.

A stepped counterbore is provided in the lower end of high pressure cylinder 50. The relatively large diameter lower portion of this stepped counterbore defines a damper cavity 70 in which a needle stop plate member 71 is disposed. The relatively small upper portion of this stepped counterbore provides a guide for a plate spring 72 which engages the top of plate 71 and biases plate 71 to a normally seated position as shown in FIGS. 1 and 8 with its lower surface peripherally seated flush against the upper end surface 24 of accumulator body 26. The lower surface of plate 71 has a lapped (sealingly seated) fit against a shoulder formed by upper body surface 24 so as to provide a fluid-tight seal in the normally seated position of plate 71. As a result, the net fluid pressure on the plate 71 is the product of 1) the interface area and 2) the difference between the ambient pressure in cavity 70 and the fluid vapor pressure. Plate 71 is sometimes referred to herein as a needle stop because it serves the function of stopping the opening stroke of the injector needle by abutting against the step or shoulder 73 between the two sections of the stepped counterbore to define the fully open position of the needle. Plate 71 performs two other important functions which will be described in more detail hereinafter. First, while still in its seated position as shown in FIG. 1, at the beginning of the opening stroke, the seated plate 71 enables the needle to open slightly to a prelift or low-lift position but stops the needle in this slightly open position for injection of a small pilot charge; and then after a brief interval of time allows the needle to proceed to its fully open position for injection of the main fuel charge. Plate 71 has a central hole 74 therethrough for admitting intensified pressurized fuel to the region below plate 71 during the intensification stroke and until initiation of injection, for holding the needle column down against the intensified pressure within the accumulator cavity. Second, plate 71 serves as a hydraulic damper for damping the end of the opening stroke of the needle to prevent needle bounce for a more uniform fuel spray in the early part of the injection event. The opening damping effect can be adjusted by adjusting the radial clearance between the periphery of stop plate 71 and the annular surface of damper cavity 70.

A fluid supply conduit 76 continuously supplies fuel to the injector 10 at rail pressure, extending longitudinally down through both control block 12 and intensifier body 18, opening downwardly through the lower end surface 22 of intensifier body 18. Fuel supply conduit 76 supplies fuel to high pressure cylinder 50 for intensification and valving on into the accumulator cavity. A cross-conduit 78 provides communication from fuel supply conduit 76 to high pressure cylinder 50, the other end of cross-conduit 78 being blocked by a high pressure plug 80, such as a "Lee Plug," disposed in a counterbore of the cross-conduit 78.

After the end of each intensification stroke during which high pressure piston 52 has delivered highly pressurized and compressed fuel from high pressure cylinder 50 into the accumulator cavity, when high pressure piston 52 moves back upwardly to its uppermost, rest position as shown in FIG. 1, it draws a vacuum in high pressure cylinder 50 below fuel inlet cross-conduit 78. When the lower end portion 57 of high pressure piston 52 uncovers cross-conduit 78 into communication with high pressure cylinder 50, fuel under rail pressure from supply conduit 76 flows through cross-conduit 78 to fill the void in the lower portion of high pressure cylinder 50.

High pressure cylinder 50 is thus loaded with fuel at rail pressure and is ready for another intensification stroke during which it greatly increases the fuel pressure above rail pressure, compressing the fuel and delivering it to the accumulator cavity. For time interval fuel metering, the amount of increase of pressurization within high pressure cylinder 50 over rail pressure will be determined by the duration of the time interval, and the corresponding length of the stroke of high pressure piston 52 downwardly from its rest position as shown in FIG. 1. For pressure compression metering, the pressure produced by the intensification stroke in high pressure cylinder 50 will be an increase above rail pressure in proportion to the ratio of the transverse area of low pressure piston 48 to the transverse area of high pressure piston 52, since the intensification stroke is timed to enable a substantial equilibrium to be achieved between the downward rail pressure force against the top of low pressure piston 48 and upward intensified fluid pressure force against the lower end 56 of high pressure piston 52, before the injection event is commenced by venting fluid pressure from above low pressure piston 48 through inlet/vent passage 64.

Reference will now be made to FIG. 4 which illustrates the fluid communication from high pressure cylinder 50 into the accumulator cavity. The axial sectional view of FIG. 4 is rotationally offset 135° from the axial section of FIG. 1, this 135° offset being clockwise looking downwardly as in FIGS. 3 and 6. A second radially oriented cross-conduit 82 is located below the upper end of the reduced diameter lower end portion 57 of high pressure piston 52 at the lowermost stroke position of high pressure piston 52 as illustrated in FIG. 4. Cross-conduit 82 defines an outlet port 83 from high pressure cylinder 50 leading to the accumulator cavity. High pressure plug 84, such as a Lee Plug, seals the drilling end of cross-conduit 82, being located in a counterbore thereof.

Cross-conduit 82 leads from outlet port 83 to a longitudinally oriented passage 86 which provides communication from high pressure cylinder 50 through a check valve 88 leading to an accumulator bore 90 which defines one portion of the overall accumulator cavity. Accumulator bore 90 is located generally in the peripheral region of accumulator body 26, and is oriented parallel to the longitudinal axis of accumulator body 26. Accumulator bore 90 extends downwardly to a location proximate the bottom of accumulator body 26 where it communicates with an annular cavity or ring passage 92 seen in FIG. 1, in the same manner as accumulator bore 96 shown in FIG. 1. There are five of these longitudinally arranged accumulator bores spaced about the peripheral region of accumulator body 26 in the form of the invention illustrated in FIGS. 1–10 which cumulatively make up the primary accumulator cavity, all of which communicate with annular cavity 92. These are seen in section in FIG. 7, and in the transverse sectional view of FIG. 6 the accumulator bore 90 is seen from its upper end and the four other accumulator bores 94, 96, 98 and 100 are shown in dotted lines.

While five of these accumulator bores make up the primary accumulator cavity in the illustrated form of the invention, it is to be understood that any desired number of such accumulator bores having any desired diameter may be provided according to the selected volume for the primary accumulator cavity of injector 10. Not only can the number and diameters of these accumulator bores be varied, but also the lengths of all of these accumulator bores except inlet bore 90 can be varied to provide the desired primary accumulator cavity volume.

A feature of the present invention is the fact that the entire accumulator cavity including the primary cavity represented by accumulator bores 90, 94, 96, 98 and 100, and annular cavity 92 are completely isolated from and independent of the injector needle spring cavity, while nevertheless being compactly arranged closely proximate the spring cavity within a lower portion of the injector, namely within accumulator body 26, and thus structurally completely separated from and independent of the upper intensifier portion of the injector. In a high pressure injector such as in the intensified injector 10, the spring cavity must be relatively large to accommodate a relatively large fast-acting needle closure spring. Separation of the accumulator cavity from the spring cavity enables the overall accumulator cavity to be much smaller than conventional accumulator cavities which include the spring cavity, for very high pressure operation of the injector 10.

As seen in FIG. 1, annular cavity or ring passage 92 communicates through a plurality of small diameter passages 102 in nozzle body 34, preferably three or four in number, to a small kidney cavity 104 in nozzle body 34 which in turn communicates with needle cavity 106 that leads to valve seat 36. The small kidney cavity 104 and needle cavity 106 together provide a small secondary accumulator cavity from which the aforesaid small pilot or initial charge is initially injected into the engine cylinder at the onset of the injection event prior to injection of the main fuel charge from the primary accumulator cavity defined in accumulator bores 90, 94, 96, 98 and 100, and annular cavity or ring passage 92. Such pilot charge is preferably about 2-20 percent of the total injected fuel charge, and most preferably about 5-10 percent of the total charge.

A cylindrical needle guide passage 108 is axially defined within nozzle body 34 between its upper end surface 32 and kidney cavity 104. Injector valve needle 110 has an upper guide position 112 which axially slideably and sealingly fits within guide passage 108. The upper guide portion 112 of needle 110 is of relatively large diameter, and below it needle 110 tapers down in the region of kidney cavity 104 to a relatively small diameter lower shank portion 114 which terminates at conical needle tip 116. The sliding fit of upper needle guide portion 112 within guide passage 108 is substantially fluid-tight and is sufficiently close to valve seat 36 for repeatably accurate centering of the needle tip 116 in valve seat 36 to provide sharper fuel cutoff and better atomization proximate the end of each injection event, as well as increased component life, relative to conventional accumulator-type injectors in which the needle was either unguided or was guided at a location axially remote from the tip.

Injector needle 110 has a flat, transverse top surface 118 at the upper end of its guide portion 112, top surface 118 being located slightly above upper end surface 32 of nozzle body 34. A small locator pin 120 extends axially upwardly from the top surface 118 of the needle to locate a spring guide and needle damper member 122 coaxially relative to needle 110. The guide/damper member 122 fits over locator pin 120 and has a flat annular damping base 124 which seats against the top surface 118 of needle 110. The damping base 124 provides damping flange means for hydraulic damping of needle closure events as described below. A reduced diameter, upwardly projecting spring locator portion 126 of guide/damper 122 provides radial centering for the needle spring. It is to be noted that the top surface 118 of needle 110, and hence also the flat annular base portion 124 of guide/damper 122, is displaced above the upper end surface 32 of nozzle body 34 in the fully closed position of needle 110, which assures complete closure of needle 110 by the needle spring.

An elongated, cylindrical spring cavity 128 extends axially upwardly from upper end surface 32 of nozzle body 34 through a major portion of the length of accumulator body 26, terminating at an upper end surface 130. The needle spring is a helical compression spring 132 which is axially arranged within spring cavity 128 with its lower end seated against the flat annular base 124 of guide/damper 122 and its upper end seated against the upper end 130 of cavity 128.

Extending axially upwardly from the upper end 130 of spring cavity 128 through the upper end surface 24 of accumulator body 26 is a plunger guide and sealing passage 134 within which the cylindrical upper sealing portion 138 of a needle plunger 136 is slideably and sealingly fitted. Needle plunger 136 has an upper end 140 which is exposed to damper cavity 70 but recessed slightly down into passage 134 below the upper body surface 24, and hence below the bottom surface of stop plate 71, in the normally seated position of plate 71. The amount of clearance between plunger end 140 and plate 71 determines the height of the small preliminary increment of needle lift for the premix pilot charge. Plunger 136 extends axially downwardly from its upper end 140 as an integral member which includes the cylindrical upper sealing portion 138 and an elongated, cylindrical lower portion 142 which extends through the spring 132 to a lower end 144 which faces and is proximate the upward projection 126 of needle guide/damper 122. Spring cavity 128 communicates through a vent passage 146 to fuel supply conduit 76 at the interface between accumulator body 26 and intensifier body 18.

Needle plunger 136 serves a series of functions in its independent capacity from needle 110 during operation of the intensified accumulator injector 10. First, during the intensification stroke of high pressure piston 52, the intensified fluid pressure in damper cavity 70 operates through stop plate hole 74 against the upper end 140 of plunger 136 to hold plunger 136 down against guide/damper 122 so as to hold needle 110 down against needle valve seat 36 with the aid of spring 132 against the upward force of the intensified pressure in the accumulator cavity against the lower part of needle 110.

Second, the length of needle plunger 136 defines the amount of clearance between plunger end 140 and the seated stop plate 71. At the onset of the needle opening event, intensified fluid pressure acts downwardly on a larger surface of plate 71 than upwardly on plate 71 because a portion of the lower surface of plate 71 is masked by its lapped fit against upper body surface 24 and thus is subject to only fluid vapor pressure. Thus, shortly after the onset of the needle opening event, plate 71 positively stops plunger 136, and hence needle 112, at a small percentage of full needle lift, and time for injection of the pilot charge is provided until the intensified pressure above plate 71 is vented sufficiently to allow needle 112 and plunger 136 to unseat plate 71 and to move plate 71 upwardly from body surface 24.

Third, the mass of plunger 136 is added to the mass of needle 110 to damp and slow down the beginning of the needle opening event, which is an added factor in allowing time for the pilot charge in cavities 104 and 106 to be injected into the engine cylinder before it can be overtaken by the main charge from the larger primary accumulator cavity.

Fourth, with needle 110 and its plunger 136 joined as an effectively unitary structure during the opening stroke of needle 110, the upper end 140 of plunger 136 is enabled to be utilized in cooperation with plate 71 to damp the end of the needle opening event. When plate 71 is moved upwardly by plunger 136 in its damper cavity 70, displacement of fluid by plate 71 is limited by the constriction between the periphery of plate 71 and the annular wall of damper cavity 70, and by the narrowing constriction between the top of plate 71 and shoulder 73, thereby damping the upper end of the needle opening event by a hydraulic damping action which may referred to as "squish damping." This prevents needle bounce at the end of the opening event.

Fifth, and of great importance in enabling a very rapid needle closing event to be achieved, the separation of needle plunger 136 from needle 110 enables needle 110 to be relatively short and of very low mass as compared to conventional accumulator injector needles, so that needle 110 can be accelerated very rapidly by spring 132 to achieve a very rapid needle closing event. The low mass and short length of separated needle 110 also minimize the amount of compression energy that can be stored in the needle upon impacting the seat, and correspondingly minimizes needle closing bounce. The mass of separated needle 110 may be as little as one-third or less than the mass of conventional accumulator injector needles, and the closing acceleration of the low mass, separated needle 110 is estimated to be in the range of from about 10,000–20,000 Gs.

With such a high speed needle closing event, it is desirable to damp the end of closure to assure against needle bounce, even with the short, light-weight needle, and this function is performed by guide/damper 122. As guide/damper 122 and needle 110 move downwardly during the needle closing event, fluid at rail pressure must be displaced from below guide/damper 122 through the constriction between the periphery of its flat annular base 124 or damping flange means and the wall of spring cavity 128 to above base 124. The guide/damper thus serves as a shock absorber to hydraulically damp the needle closure in a squish damping action, cushioning the end of the injection event. This is a further factor in preventing the needle from dynamically or mechanically bouncing from compression energy that might otherwise be stored along the length of the needle upon impacting the seat. This closing damper effect can be adjusted by adjusting the radial clearance between the periphery of guide/damper base 124 and the surface of spring cavity 128, or by adjusting the axial clearance between the bottom of guide/damper base 124 and upper surface 32 of nozzle body 34, or by making both adjustments.

If desired, a slight annular relief cavity (not shown) may be provided in the wall of spring cavity 128 offset above the lower end of cavity 128 so as to allow fluid to bypass the periphery of guide/damper base 124 more freely during the early part of the needle closing stroke, while still presenting the full constriction between the periphery of base 124 and the wall of spring cavity 128 during the final phase of the closure stroke. However, experiments have shown that the shock absorbing effect of the fluid constriction between the periphery of guide/damper base 124 and the unrelieved cylindrical wall of spring cavity 128 effectively eliminates secondary injections from needle bounce without detrimentally slowing down the high rate of needle closure enabled by the short, very low mass needle 110. Cooperating in such elimination of needle bounce is the very fact that the needle is short. This causes minimization of the amount of longitudinal elastic compression energy that can be stored in the needle upon impact with the seat.

Spring cavity 128, in addition to serving the functions of housing needle return spring 132 and cooperating with guide/damper 122 to damp the closure stroke of needle 110, also serves as a collector for any intensified pressure fuel which may seep between the upper sealing portion 138 of needle plunger 136 and its passage 134, or between the upper guide portion 112 of needle 110 and its guide passage 108, or from annular cavity 92 radially inwardly past the inner interface between lower accumulator body surface 30 and upper nozzle body surface 32.

Operation of the Intensified Form of the Invention

Overall and specific systems for operating an intensifier-type accumulator injector of the general type of the present invention are illustrated and described in detail in the Beck et al. U.S. Pat. No. 4,628,881, including the aforesaid high speed solenoid actuated control valve, and such systems are fully applicable for operating the intensifier-type accumulator of the present invention. Accordingly, the Beck et al. U.S. Pat. No. 4,628,881 is hereby incorporated by reference for its disclosures of apparatus and methods for operating the intensifier-type accumulator injectors 10 of the present invention.

Operation of the present invention is best understood with reference to FIGS. 1, 4, 8 and 11–13 of the drawings. FIG. 1 illustrates injector 10 in a position of repose prior to a sequence of intensification and injection events. Inlet/vent passage 64 is vented to a sufficiently reduced pressure, which may be essentially atmospheric pressure, to enable spring 62 to bias low pressure piston 48 and high pressure piston 52 to their uppermost positions, with the lower end 56 of high pressure piston 52 above fuel inlet cross-conduit 78. Fuel supply conduit 76 is constantly supplied with fuel at rail pressure, and high pressure cylinder 50 below piston 52 has been filled with fuel at rail pressure from fuel supply conduit 76 through inlet conduit 78 and fuel port 79. Injector needle 110 is closed against needle valve seat 36, and accumulator inlet check valve 88 is also closed, with the fuel pressure within the accumulator cavity static at the needle closure pressure, which is preferably relatively high for a crisp needle closing event with good fuel atomization right up to closure and minimal, if any, fuel dribble proximate closure. Typically, this static, residual pressure within the accumulator cavity will be in the range of from about 3,000 psig to about 6,000 psig, and preferably it will be in the high pressure part of this range for best fuel cutoff characteristics. Needle stop plate 71 is biased by spring 72 to its sealed position against the upper surface 24 of accumulator body 26. Needle plunger 136 may, in this rest condition of injector 10, be in any position from where its lower end 144 is in contact with guide/damper 122 to where its upper end 140 is in contact with stop plate 71.

An intensification stroke is caused by introduction of fuel at rail pressure through actuating fluid inlet passage 64 into low pressure cylinder 46 to drive low pressure piston 48 downwardly, piston 48 carrying high pressure piston 52 downwardly with it for the intensifying stroke, the extent of this stroke being determined either by the time duration of application of rail pressure through passage 64 for time metering or by the pressure of the fuel introduced through passage 64 for pressure metering. The maximum travel of this intensification stroke is to the position of high pressure piston 52 shown in FIG. 4, with the upper end of reduced portion 57 still being located above the high pressure cylinder outlet port 83 so that port 83 remains clear. During this downward intensification stroke of the pistons, fuel is pressurized and compressed within high pressure cylinder 50, and such pressurization and compression is transmitted into the entire accumulator cavity through high pressure cylinder outlet port 83, cross-conduit 82, longitudinal passage 86, check valve 88, and accumulator bore 90, the pressurized, compressed fuel passing from bore 90 into annular cavity 92 and thence into accumulator bores 94, 96, 98 and 100, and also downwardly through nozzle passages 102 into kidney cavity 104 and needle cavity 106. The quantity of fuel thus poised in the accumulator cavity for injection depends upon the amount of compression of the fuel within the accumulator cavity, which depends upon the amount of pressure provided by the intensifier stroke, and this may range from about 6,000–7,000 psig for minimum engine power at idle up to about 22,000 psig or even higher for maximum engine power.

During the intensification stroke, the increasingly high intensified pressure within high pressure cylinder 50 is applied through damper cavity 70 to the upper end surface 140 of needle plunger 136. Plunger 136 seats against guide/damper 122 and transmits the resulting force of the intensified pressure to guide/damper 122 and thence to top surface 118 of needle 110, and this force, together with the force of needle spring 132, securely holds needle 110 down on its seat 36. This downward force on needle 110 is greater than the upward force as determined by the intensified pressure within kidney cavity 104 and needle cavity 106 operating upwardly on the differential area between the cross-section of upper guide portion 112 of the needle and the area of the needle seat.

At the end of the intensification stroke, injector 10 is ready for an injection event, which is initiated by venting the actuating fluid inlet/vent passage 64, and hence low pressure cylinder 46, to a reduced pressure. This allows piston spring 62 to move both of the pistons 48 and 52 upwardly at a rate which may be controlled by orificing of passage 64, which now serves as a vent conduit. The mode of operation of the two-stage needle lift is best understood with reference to the graph or chart in FIG. 11.

The solid line curve 149 in FIG. 11 represents a plot of intensifier pressure (the pressure within intensifier cylinder 50) versus time. Curve 149 shows the rate of decay of pressure in intensifier cylinder 50 as it may be controlled by orificing of vent passage 64. Adjustment of the orificing of vent passage 64 will cause a corresponding adjustment of the rate of decay or slope of pressure/time curve 149. Thus, a greater constriction of the orificing in passage 64, with a reduced vent flow rate, will result in a flatter pressure/time curve 149; while a lesser constriction in passage 64, with correspondingly increased vent fluid flow through passage 64, will result in a steeper slope for pressure/time curve 149.

The dotted line curve 150 represents needle position versus time, and shows how the needle lift timing relates to the intensifier pressure decay represented by curve 149.

At time $T_0$ the injection event is set into motion by commencement of venting of low pressure cylinder 46 through vent passage 64. At this time the needle is closed, or has zero lift. As the pressure decays from $T_0$ to $T_1$, the needle remains closed because $$A_{p1}(P_{int}) > P_{acc}(A_{stem} - A_{seat}) - F_s$$

where $A_{p1}$ is the cross-sectional area of upper portion 138 of plunger 136

$P_{int}$ is pressure in intensifier cylinder 50

$P_{acc}$ is pressure in the accumulator cavity $A_{stem}$ is the area of the upper guide portion 112 of needle 110

$A_{seat}$ is the area of the needle valve seat $F_s$ is the force of needle spring 132.

The needle lifts initially to its prelift increment at time $T_1$ when $A_{p1}(P_{int}) = P_{acc}(A_{stem} - A_{seat}) - F_s$. This initial prelift increment is preferably in the range of from about 1–20 percent of maximum needle lift. It is shown on curve 150 as being approximately 5 micrometers, or 0.005 millimeters. This low-lift or prelift increment of the needle lift is defined when the upper end 140 of plunger 136 is stopped against the bottom surface of stop plate 71 which is seated and sealed against upper surface 24 of accumulator body 26. The upward blip of pressure/time curve 149 at $T_1$ represents a momentary pressure surge in intensifier cylinder 50 caused by the upward shift of plunger 136. Between $T_1$ and $T_2$, stop plate 71 remains seated against body surface 24 to hold the needle at the fixed prelift increment because $$A_{p2}(P_{int}) + F_{s1} > P_{acc}(A_{stem} - A_{seat}) - F_s$$

where $A_{p2}$ is the cross-sectional area of stop plate 71 which is sealed against upper body surface 24

$F_{s1}$ is the force of plate spring 72.

The needle lifts completely starting at time $T_2$ when $$A_{p2}(P_{int}) + F_{s1} = P_{acc}(A_{stem} - A_{seat}) - F_s$$

In the example of FIG. 11, full needle lift is approximately 0.2 millimeters. At time $T_2$, stop plate 71 becomes unseated from upper body, surface 24 so that the seal between the plate 71 and the shoulder 24 is broken and the vapor pressure acting on the bottom of plate 71 increases to the ambient pressure in cavity 70. Plate 71 thus shifts upwardly to become seated on stop shoulder 73. The pressure blip proximate $T_2$ is caused by a transitory pressure surge in intensifier cylinder 50 when plunger 136 and stop plate 71 shift upwardly.

The volume of the pilot charge will vary generally proportionally to both the time duration between $T_1$ and $T_2$ and the height of the needle prelift increment, both indicated by the dotted line curve 150. It is preferably about 2–20 percent of the total fuel charge, and most preferably about 5–10 percent of the total charge.

Figure 12:
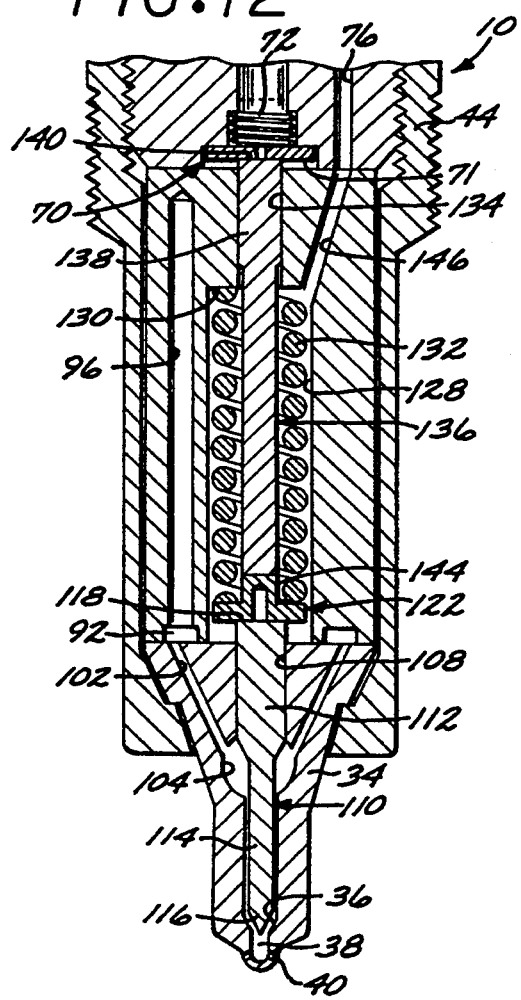
FIG. 12 shows a lower portion of FIG. 1, but with the needle in its fully lifted position.

In FIG. 12, needle 110 is shown in its fully open position, with needle 110, guide/damper 122, plunger 136 and stop plate 71 all closed together in a solid column, and stop plate 71 seated against shoulder 73.

The two phases of needle opening movement proximate $T_1$ and $T_2$ are slowed down and controlled by addition of the mass of plunger 136 to the mass of needle 110. The very short distance needle 110 and plunger 136 travel during the prelift phase does not allow enough momentum to build up in the needle/plunger combination to jar plate 71 off of its seated, sealed position. Then, when needle 110, plunger 136 and plate 71 move on upwardly in the second opening phase for the main injection, plate 71 damps the end of the opening event by hydraulic squish damping. This is caused both by the closely constricted peripheral zone between the outer annular surface of plate 71 which restricts fluid flow from above to below plate 71, and by the narrowing gap as the upper surface of plate 71 approaches its mating shoulder 73. The result is substantial elimination of needle bounce at the end of the opening event, with better spray uniformity at the beginning of the main part of the injection.

The needle remains open during the second phase or main part of the injection event as long as $$P_{acc}(A_{stem} - A_{seat}) > F_s$$

Then the needle closing event commences when $$P_{acc}(A_{stem} - A_{seat}) = F_s$$

Needle closure then occurs rapidly until complete closure occurs at time $T_3$. Separation of needle 110 from plunger 136 during needle closure greatly reduces the effective mass and hence the inertia of the needle so that needle 110 can be accelerated very rapidly by spring 132 to achieve a rapid, crisp closing event; while at the same time, the low mass and short length of the separated needle 110 minimize needle bounce by minimizing the amount of compression energy that can be stored in the needle upon closing impact with the seat.

Figure 13:
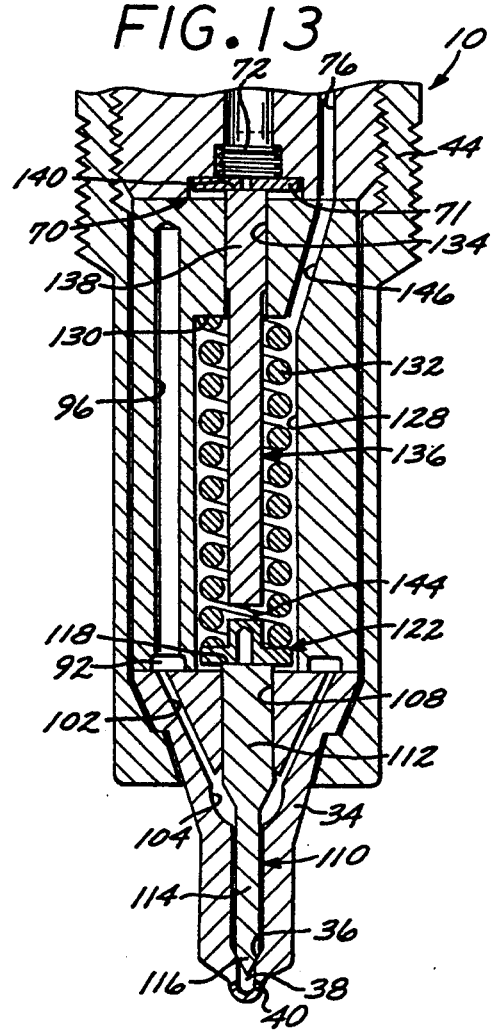
FIG. 13 is a view similar to FIG. 12, illustrating closure of the needle separated from the needle plunger.

FIG. 13 illustrates the separation of needle 110 and its guide/damper 122 from needle plunger 136 during the closing event. Since needle 110 and guide/damper 122 are completely separate parts from needle plunger 136, they are enabled to be driven entirely independently of plunger 136 from the open position of FIG. 12 through the closing event to the closed position of FIG. 13.

Needle bounce is also minimized by the squish damping effect resulting from the small clearance between the flanged periphery of guide/damper 124 and the cylindrical surface of spring cavity 128, and also by the limited clearance between the bottom of guide/damper 124 and the upper surface 32 of nozzle body 34. The very light-weight, short needle 110 cooperates in such squish damping by minimizing the amount of needle inertia which must be controlled by the damping. With these factors cooperating, needle bounce is substantially eliminated in the present invention. With relatively high closing accumulator pressure, the rapid, crisp closing event, coupled with the substantial elimination of closing needle bounce, enable full fuel atomization to be maintained right up to needle closure, for optimum ignition. The sharp closure cutoff and elimination of fuel dribble at closure are important in the elimination of smoke and hydrocarbon emissions.

It is to be noted that the needle closure damper, represented by the guide/damper and its small clearances relative to the surface of spring cavity 128 and surface 32 of nozzle nody 34, is remote from needle tip 116 and valve seat 36. This permits efficient-shaping of the needle tip and valve seat for a high flow coefficient as the needle approaches the seat during closure. Such high flow coefficient enables high pressure to be maintained proximate the seat for good atomization up to closure.

Another factor which assures sharp fuel cutoff at needle closure is the close proximity of needle guide portion 112 in guide passage 108 to the needle seat 36. By this means, the needle is continuously guided for consistent concentric seat contact. This is a factor in making the end of the injection event stronger than for conventional accumulator injector needles, with resulting better atomization at the end of injection. Consistent concentric closure contact of the needle in the seat assures a high flow coefficient and consequent high closing pressure and good atomization.

Referring again to FIG. 11, although the invention is not limited to any particular time intervals, typically the time from $T_0$ to $T_1$ will be on the order of about 0.1–0.3 milliseconds, and the time from $T_2$ to $T_3$ will be on the order of about 4–8 milliseconds. By way of comparison, with a conventional accumulator-type injector, the needle will be fully opened in on the order of about 0.2 milliseconds.

As an alternative to, or in addition to, controlling the rate of decay of the intensifier pressure as represented by curve 149 in FIG. 11 by means of orificing of vent passage 64 to slow down the vent rate from low pressure cylinder 46, the vent rate from low pressure cylinder 46 can also be controlled by adjusting the pressure level in the vent line. Thus, by raising the vent pressure in passage 64, the differential pressure between low pressure cylinder 46 and vent passage 64 will be lowered, correspondingly lowering the rate of fluid venting from low pressure cylinder 46, and accordingly flattening the intensifier pressure/time curve 149 in FIG. 11. Conversely, lowering of the vent pressure level in vent passage 64 will increase the pressure differential between low pressure cylinder 46 and vent passage 64, steepening the intensifier pressure/time curve 149 in FIG. 11. Such adjustments will, therefore, vary the time intervals between $T_0$ and $T_1$ and between $T_1$ and $T_2$.

The two-stage opening of the needle in the present invention to provide a small initial pilot charge followed by the main charge has important benefits. The small amount of fuel in the pilot charge will ignite before the needle opens fully, so that the fire has started when the main charge is injected. This causes the main charge to ignite immediately upon injection, without the usual large percentage of the main charge being injected before it ignites. This provides a great reduction in noise, improvement of fuel economy, and elimination of smoke. It also greatly reduces undesirable exhaust emissions, principally oxides of nitrogen and hydrocarbon emissions.

In the foregoing description of the intensified form 10 of the invention, full needle lift has been indicated as being determined by engagement of stop plate 71 against stop shoulder 73. This will always be true for high power engine settings. However, the amount of needle lift off of its seat will actually vary generally in proportion to the difference between the opening and closing pressures of the accumulator as discussed in detail hereinafter in connection with the unintensified form of the invention shown in FIGS. 14–17. Accordingly, it is to be understood that for low and intermediate engine power settings, typically the needle will not lift off of the seat during the second, main phase of the injection sufficiently for stop plate 71 to fully seat against shoulder 73.

FIG. 9 illustrates a modified stop plate 71a which defines the prelift increment by the depth of a downwardly facing annular, axial recess 147 in plate 71a. Here, in the lowermost position of plunger 136a which is shown, its top surface 140a registers with the upper surface 24 of accumulator-body 26. This modification enables stop plate 71a to be thicker than stop plate 71 of FIGS. 1, 4 and 8, thereby minimizing the possibility of flexure of plate 71a when it is impacted by plunger 136a, so as to assure maintenance of the seal between the bottom surface of plate 71a and the upper body surface 24. Damper cavity 70a in intensifier body 18a is made correspondingly deeper to accommodate the thicker plate 71a.

FIG. 10 illustrates a further modified stop plate arrangement which would eliminate any possibility of the prelift seal between the stop plate and the body being disrupted by the impact of the plunger against the plate. In this case, two annular seals are employed in place of the flat seal of each of the stop plates 71 and 71a against the respective bodies. In the form of FIG. 10, plate 71b is made still thicker to accommodate a deeper annular, axial recess 147b in the bottom of plate 71b, and the upper end of plunger 136b extends up into recess 147b in the lowermost position of plunger 136b which is shown. The prelift increment of movement is defined by the spacing between upper end surface 140b of plunger 136b and the end of plate recess 147b. A first lapped seal is provided between the cylindrical outer periphery of plate 71b and the cylindrical surface of damper cavity 70b, and a second lapped seal is provided between the cylindrical surface of plunger 136b and the opposed cylindrical surface of plate recess 147b. These two annular seals serve the same sealing function as the single flat seal in the other two forms, but they cannot be disrupted by impacting of plunger 136b against plate 71b. Damper cavity 70b is given still further depth to accommodate the thicker stop plate 71b.

In the embodiment of FIG. 10, hydraulic damping of full-lift needle opening events is caused by the constriction between the top surface of plate 71b and shoulder 73b as plate 71b approaches shoulder 73b.

Unintensified Form of the Invention

An unintensified form of the invention is illustrated in FIGS. 14–17 of the drawings. The unintensified accumulator injector of the invention has particular utility for gasoline engines, for which the injection pressures will typically be considerably less than for diesel engines. Nevertheless, it is to be understood that the unintensified form of the invention shown in FIGS. 14–17 may be beneficially employed with both diesel and gasoline engines, or with engines powered by other liquid fuels. In the unintensified form of the invention, the pressure of the fuel in the accumulator immediately preceding the injection event is substantially rail pressure, and this can be adjusted to accommodate the requirements of any type engine.

The unintensified accumulator injector shown in FIGS. 14–17 is generally designated 152, and has an elongated body 153 with a relatively large diameter upper portion 154 and a relatively small diameter lower portion 156. The lower body portion 156 forms an inner core structure within the accumulator cavity, and defines the needle spring cavity separately from the accumulator cavity. Body 152 has a flat, transverse lower end surface 158 which is lapped to the complementary flat, transverse upper surface 160 of nozzle body 162. Nozzle body 162 carries a pintle-type nozzle generally designated 164, the structure and operation of which will be described in detail hereinafter in connection with FIGS. 15–17.

Elongated body 153 and nozzle body 162 are both carried in a housing generally designated 166. Housing 166 has an internally threaded upper coupling section 168 within which the upper body portion 154 is threadedly coupled, with an O-ring seal 170 engaged between body portion 154 and housing 166 to provide a fluid-tight seal for the accumulator cavity within housing 166. Housing 166 has an intermediate barrel section 172, and a reduced diameter lower end section 174 which provides a seat for nozzle body 162, with a seal ring 175 providing a fluid-tight seal between nozzle body 162 and the inwardly flanged lower end of housing 166.

Fuel is supplied to injector 152 from a high speed solenoid actuated valve (not shown) at common rail (regulated pump) pressure through a fuel supply conduit 176 in body 152 for pressurizing the accumulator cavity. The rail pressure fuel passes from supply conduit 176 through a short communicating transverse conduit 178, past a check valve 180, and thence through a generally longitudinally arranged conduit 182 into the primary accumulator cavity which includes an upper portion 184 defined between the inner surface 186 of housing barrel section 172 and the stepped outer surfaces 188 and 190 of lower body portion 156; and a lower portion 192 defined between a reduced diameter inner housing surface 194 and both the elongated body surface 190 and the outer surface 196 of nozzle body 162. A plurality of passages 198, preferably three or four in number, extends downwardly and radially inwardly from lower accumulator cavity section 192 to kidney cavity 200 which surrounds the lower end portion of the valve needle and communicates with the valve seat 202 through a cavity extension 203. Kidney cavity 200 and its extension 203 together form a small secondary accumulator cavity for providing a small initial injection charge before the primary injection charge comes from the main accumulator cavity consisting of respective upper and lower primary cavity sections 184 and 192.

The injector needle is generally designated 204, and includes a cylindrical upper guide portion 206, the needle tapering down to a relatively smaller diameter lower shank portion 208 leading to the needle tip. Upper guide portion 206 of needle 204 is axially slideably and sealingly mounted in a needle guide passage 209 which extends from kidney cavity 200 axially through nozzle body 162.

Figure 14:
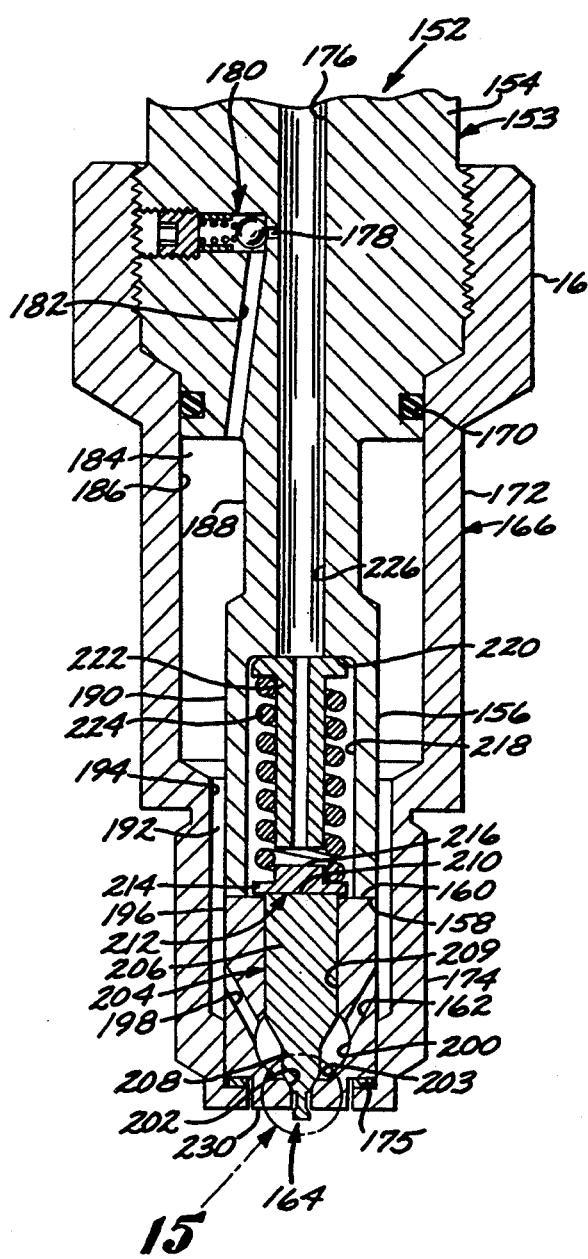
FIG. 14 is an enlarged longitudinal, axial sectional view, partly in elevation, showing an unintensified form of the invention which has a variable pintle nozzle.

Injector needle 204 has a flat, transverse top surface 210 located slightly above upper end surface 160 of the nozzle body 162 in the closed position of needle 204 as shown in FIG. 14. A needle damper and lower spring guide 212 seats flush against the top surface 210 of the needle. Damper/guide 212 has a flat annular damping base or flange 214 and an axially upwardly projecting spring locator portion 216 of reduced diameter. Damper/guide member 212 is located in the lower end portion of an elongated, cylindrical spring cavity 218 which is axially disposed within the lower portion 156 of central body 152. Spring cavity 218 extends from a lower end defined by the upper surface 160 of nozzle body 162 axially upwardly to an upper end 220 against which an elongated, tubular upper spring guide 222 seats. Needle spring 224, which is a helical compression spring, is engaged between damper/guide 212 and guide 222. A downward extension 226 of fuel supply conduit 176 communicates through tubular upper guide 222 to spring cavity 218 so as to apply fuel at rail pressure within spring cavity 218 when the accumulator cavity is pressurized. Spring cavity 218 is solidly filled with fuel at all times during operation of injector 150, pressurized fuel within cavity 218 operating downwardly against the needle top surface 210 together with the force of spring 224 holding needle 204 down when the accumulator cavity is pressurized, and the presence of fuel in cavity 218 enabling damper/guide 212 to perform its hydraulic needle damping function at the end of each injection event.

As with the intensified form of the invention, an advantage of the unintensified form shown in FIGS. 14–17 is the fact that the entire accumulator cavity is completely isolated from and independent of the injector needle spring cavity, while nevertheless being arranged closely proximate the spring cavity within a lower portion of the injector, and being concentrically and thereby compactly oriented about the spring cavity. This enables the spring cavity to be made relatively large to accommodate a relatively large, fast-acting needle closure spring, while at the same time placing no limit on how small the accumulator cavity may be made for high pressure operation of the injector 152.

As with the intensified form, the unintensified form of FIGS. 14–17 has the advantages of a short, light-weight needle and remote location of the needle closure damper relative to the needle and its seat, with the same advantages as set forth hereinabove for the intensified form.

Figure 15:
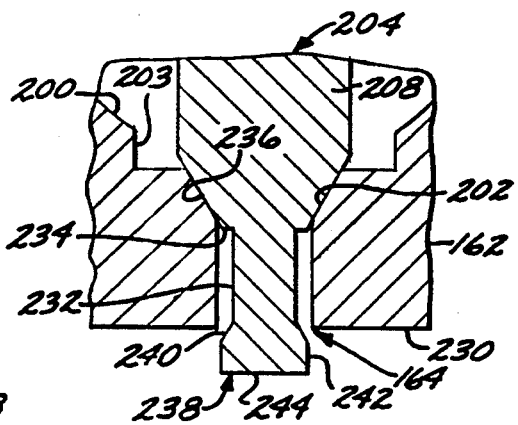
FIG. 15 is a greatly enlarged fragmentary sectional view of the encircled portion of FIG. 14 designated "15", with the needle valve shown in its fully closed position.
Figure 16:
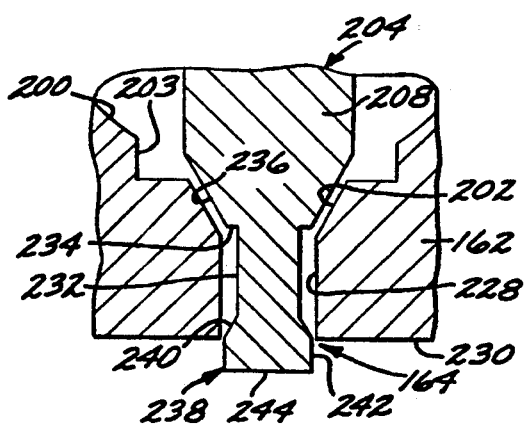
FIG. 16 is a view similar to FIG. 15, with the needle valve in a partially opened position.
Figure 17:
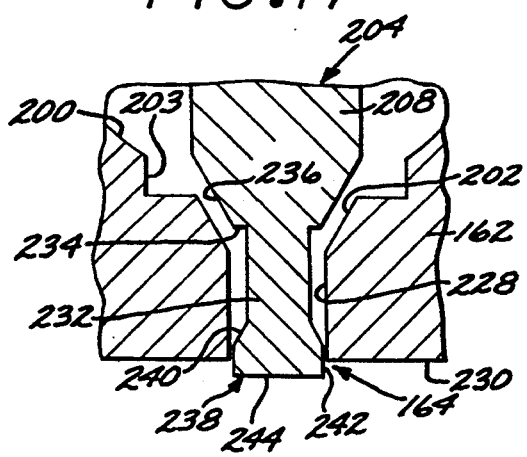
FIG. 17 is a view similar to FIGS. 15 and 16, with the needle valve in its fully opened position.

FIGS. 15, 16 and 17 illustrate the structure and operation of pintle nozzle 164, FIG. 15 showing nozzle 164 in its fully closed position, FIG. 16 showing nozzle 164 in a partially opened position, and FIG. 17 showing nozzle 164 in its fully opened position. Pintle nozzle 164 has a cylindrical orifice 228 which extends axially from frustoconical valve seat 202 downwardly through the lower end 230 of injector 150, which is the flat lower end surface of nozzle body 162. A reduced diameter pintle shank 232 extends axially downwardly from the lower end 234 of needle 204 which is located just below the frustoconical needle seating surface 236. A flared pintle head 238 on the lower end of pintle shank 232 has a frustoconical downwardly and radially outwardly deflecting spray surface or flare portion 240, pintel head 238 ending in a lower cylindrical tip portion 242 which has a flat, transverse end surface 244. Pintle nozzle 164 produces a generally conical injection spray, the cone angle of which varies generally in inverse proportion to the volume of fuel injected into an engine cylinder during each injection event, the cone angle varying from a relatively widespread cone angle at minimum or idle engine power down to a relatively narrow cone angle at high or maximum engine power.

Operation of the Unintensified Form of the Invention

The overall and specific systems shown and described in the Beck et al. U.S. Pat. No. 4,628,881 for operating an unintensified accumulator injector, such as that in FIGS. 16–18 of that patent, including the aforesaid high speed solenoid actuated control valve, are fully applicable for operating the unintensified accumulator injector of the present invention. Accordingly, the Beck et al. U.S. Pat. No. 4,628,881 is hereby incorporated by reference for its disclosures of apparatus and methods for operating the unintensified accumulator injectors 152 of the present invention.

Figure 18:
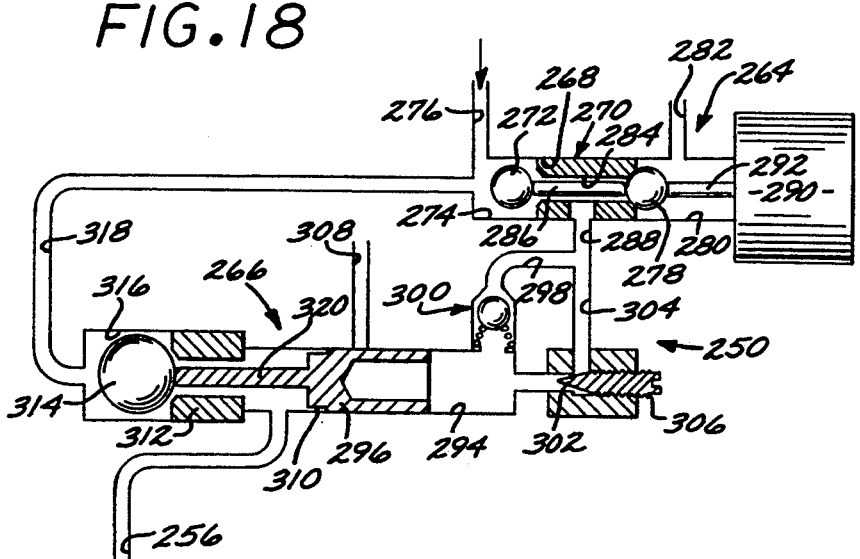
FIG. 18 is a diagrammatic illustration of a hydraulic circuit-controlled two-stage needle lift system, shown with its solenoid valve energized and control piston fully extended preparatory to the commencement of an injection event.

As with the intensified form of the invention, an overall system for operating an unintensified-type accumulator injector of the general type of the present invention is illustrated and described in detail in the Beck et al. U.S. Pat. No. 4,628,881, and everything disclosed in that patent relative to systems for operating unintensified injectors and modes of operation of unintensified injectors is applicable for operation of the unintensified-type accumulator injectors 152 of the present invention. Accordingly, the Beck et al. U.S. Pat. No. 4,628,881 is hereby incorporated by reference for its disclosures of apparatus and methods for operating the unintensified-type accumulator injectors 152 of the present invention. The unintensified version of the invention disclosed in the Beck et al. '881 patent is illustrated in FIGS. 16–18 of that patent and described in detail in connection therewith.

Fuel at rail pressure is valved to fuel supply conduit 176, preferably by actuation of a high speed solenoid actuated valve which may be like the valve 30 shown and described in detail in the Beck et al. '881 patent, which is best illustrated in FIGS. 5a, 9 and 10 of that patent, and is illustrated in connection with the unintensified form of injector in FIGS. 16–18 of that patent. As with the intensified form of the present invention, it is desirable to incorporate in the unintensified form of the present invention features which are covered in the previously referred to co-pending applications Ser. Nos. 823,807 and 830,000.

The incremental volume of fuel injected during each injection event of injector 152 will be determined by the pressure of the fuel that is built up in the accumulator cavity by fuel introduced through fuel supply conduit 176. Such accumulator pressure may be determined by time interval or pulse width fuel metering from a source with a fixed rail pressure, or by pressure compressability metering from a variable rail pressure source, or a combination of both types of fuel metering. The injection pressure may be varied according to the needs of any engine, typically from about 500 psig to about 2,000 psig for direct injection gasoline engines, and typically from about 500 psig to about 22,000 psig for diesel engines.

During the accumulator cavity pressurizing phase of the injector operating cycle, pressurized fuel entering fuel supply conduit 176 will be introduced into the accumulator cavity through transverse conduit 178, check valve 180, and conduit 182 until the pressure required for any particular power setting of the engine is achieved in the accumulator cavity. Before the actual injection event occurs, the pressure will be substantially uniform in all portions of the accumulator cavity, including the primary accumulator cavity consisting principally of upper portion 184 and lower portion 192, and also including the small volume within entry conduit 182 and the small volume within nozzle passages 198, and the secondary accumulator cavity consisting of kidney cavity 200 and its extension 203. For time interval or pulse width fuel metering, the pressure in the accumulator cavity will be raised to substantially the fixed rail pressure for maximum power, and will be proportionately less for lower power settings. For pressure compressibility metering, the pressure will be raised in the accumulator cavity to substantially the rail pressure which will vary from a maximum pressure for a full power setting of the engine and a proportionately lesser pressure for lower power settings of the engine.

When the programmed pressure for an injection event has been achieved within the accumulator cavity, either at the end of the pressure input pulse through supply conduit 176 for time interval or pulse width metering, or upon substantially reaching a fluid pressure balance of the pressure in supply conduit 176 and the pressure in the accumulator cavity for pressure compressibility metering, check valve 180 will close to seal off the accumulator cavity from supply conduit 176. During pressurization of the accumulator cavity and after such pressurization but before commencement of the injection event, injector needle 204 will be positively held down against valve seat 202 by the combined forces of compression spring 224 and fluid pressure applied from within spring cavity 218 against the top surface 210 of needle 204. These combined downward forces on needle 204 overpower the upward force on needle 204 which is the force of fluid pressure in the accumulator cavity operating upwardly against the differential area of the cross-section of upper needle portion 206 minus the seating area of the needle seating surface 236 against valve seat 202.

After the accumulator cavity has been pressurized to the programmed extent, the injection event is initiated by movement of the control valve to a vent position which relieves the pressure from supply conduit 176. This relieves the fluid pressure from within spring cavity 218, and hence from top surface 210 of needle 204 through tubular upper spring guide 222 and supply conduit extension 226, and the fluid pressure in the accumulator cavity operating upwardly on the aforesaid differential cross-sectional area of the needle overcomes the force of spring 224 and lifts needle 204 up off of valve seat 202 to commence the injection event. The injection will continue, with needle seating surface 236 separated from seat 202, until the accumulator pressure drops to a level at which spring 224 overcomes the upward force of the reduced accumulator pressure on the aforesaid needle differential area, at which time the needle surface 236 will again seat on valve seat 202 to complete the injection event.

The incremental volume of fuel injected during the injection event will be approximately proportional to the difference between the opening and closing pressures within the accumulator cavity, the closing pressure being determined by the axial compression force of the needle spring 224 that is selected. Thus, the volume of fuel injected is based upon the compressibility of the fuel within the accumulator cavity. The needle closing force of spring 224 is preferably selected to maintain a relatively high accumulator cavity pressure at the end of injection so as to provide a crisp closing event without any material fuel dribble, and with the injected fuel still being properly atomized at the end of injection. Such closing pressure may be on the order of about 3,000–4,000 psig.

Although not shown, if desired, the unintensified form of the invention may be arranged to have a two-part needle with a needle plunger like plunger 136 of the intensified form, for slowing down the opening movement of the needle, while nevertheless enabling the needle to be short and light-weight for fast closure with minimum possible closure bounce. Also, if desired, although not shown, the unintensified form of the invention may embody a damper cavity like cavity 70 of the intensified form in the fuel supply (and vent) conduit extension 226, with an opening stop plate or wafer like stop plate 71 of the intensified form biased against a lapped seat, for providing a two-step opening event as in the intensified form. In such case, the upper spring guide 222 would be omitted.

Needle closure damping is effected in the same way in the unintensified form of the invention shown in FIGS. 14–17 as in the intensified form shown in FIGS. 1–13, damper/guide 212 in the unintensified form operating in the same manner as damper/guide 122 in the intensified form. Thus, during the closing event, fuel must be displaced from below annular base 214 of guide/damper 212 between the flanged periphery of base 214 and the wall of spring cavity 218 to above the base 214. This provides hydraulic squish damping of needle 204, preventing needle bounce and consequent fuel dribble often associated with high speed needle closure. Needle 204 of unintensified injector 150 is very short, and consequently may be very light in weight so as to cooperate in such squish damping by minimizing the amount of needle inertia which must be controlled. The needle closure damping effect can be adjusted by adjusting the radial clearance around and under damper/guide 212.

A unique operational feature of an accumulator-type injector is that the amount of lift of the needle off of its valve seat varies generally in proportion to the difference between the accumulator opening and closing pressures. Since the incremental volume of fuel injected during an injection event is also generally proportional to the difference between the opening and closing pressures, the amount of needle lift during an injection event will be generally proportional to the incremental fuel volume delivered during the injection event. Advantage is taken of this characteristic of the accumulator injector in the form of the invention shown in FIGS. 14–17 to tailor the spray configuration variably according to the power demands of the engine so as to optimize combustion at varying power settings. This is accomplished with the pintle-type nozzle 164 in injector 152. The manner in which pintle nozzle 164 thus tailors the spray is illustrated in FIGS. 15, 16 and 17.

At relatively low fuel delivery, as for example during engine idle, best combustion is achieved with a relatively wide, flat conical spray configuration. At higher and higher power settings, it is desirable to have the cone of the spray become narrower and narrower, and a relatively narrow spray cone is most efficient for a full power setting to get the spray through the whole cylinder combustion cavity.

FIG. 15 illustrates needle 204 in its fully closed position, with its seating surface 236 fully seated against valve seat 202. In this position of needle 204, the flared pintle head 238 is substantially entirely outside of the cylindrical valve output orifice 228. As the needle lifts slightly above seat 202 in a minimum power setting of the engine, pintle head 238 is still mostly outside of orifice 228, enabling the frustoconical deflecting surface 240 of pintle head 238 to deflect the injected fuel at a maximum cone angle of relatively flat configuration.

FIG. 16 shows needle 204 at an intermediate fuel delivery position for intermediate engine power, the needle being shown in FIG. 12 approximately half-way between its fully closed and fully opened positions. In the intermediate needle position of FIG. 12, pintle head deflecting surface 240 is substantially completely within cylindrical orifice 228, but it is still in a position to cause a considerable amount of deflection of the fuel into a substantial cone angle of the injected spray.

In the fully opened position of the needle illustrated in FIG. 17, the cylindrical tip portion 242 of pintle head 238 has moved part-way into cylindrical orifice 228 to provide a narrow cylindrical fuel ejection annulus which greatly reduces the deflecting effect of the frustoconical surface 240 to produce a relatively narrow conical fuel spray configuration which optimizes combustion at high fuel delivery for high engine power Selection of the deflecting surface 240 of pintle head 238 to be substantially frustoconical assures that the spray configuration will be generally conical.

While the straight cylindrical orifice 228 and pintle head 238 with a frustoconical deflecting surface 240 and a straight cylindrical tip portion 242 provide good tailoring of the spray configuration to match varying fuel deliveries, it is to be understood that the contours of orifice 228 and pintle head 238 may be varied as desired to meet particular engine requirements within the scope of the invention. It is also to be understood that a pintle-type nozzle such as nozzle 164 shown in FIGS. 14-17 may optionally be employed in an intensified form of the present invention such as that shown in FIGS. 1-13.

The hydraulic damping of needle closure events provided by damping flange 214 within spring cavity 218 cooperates with the spray tailoring of pintle nozzle 164 to preserve the tailored configuration of the spray right up to needle closure, without altered spray characteristics as would be otherwise caused by needle bounce. By having the damper in the spring cavity and thus remote from the needle tip, the damper cannot alter the flow characteristics of the pintle nozzle.

Figure 19:
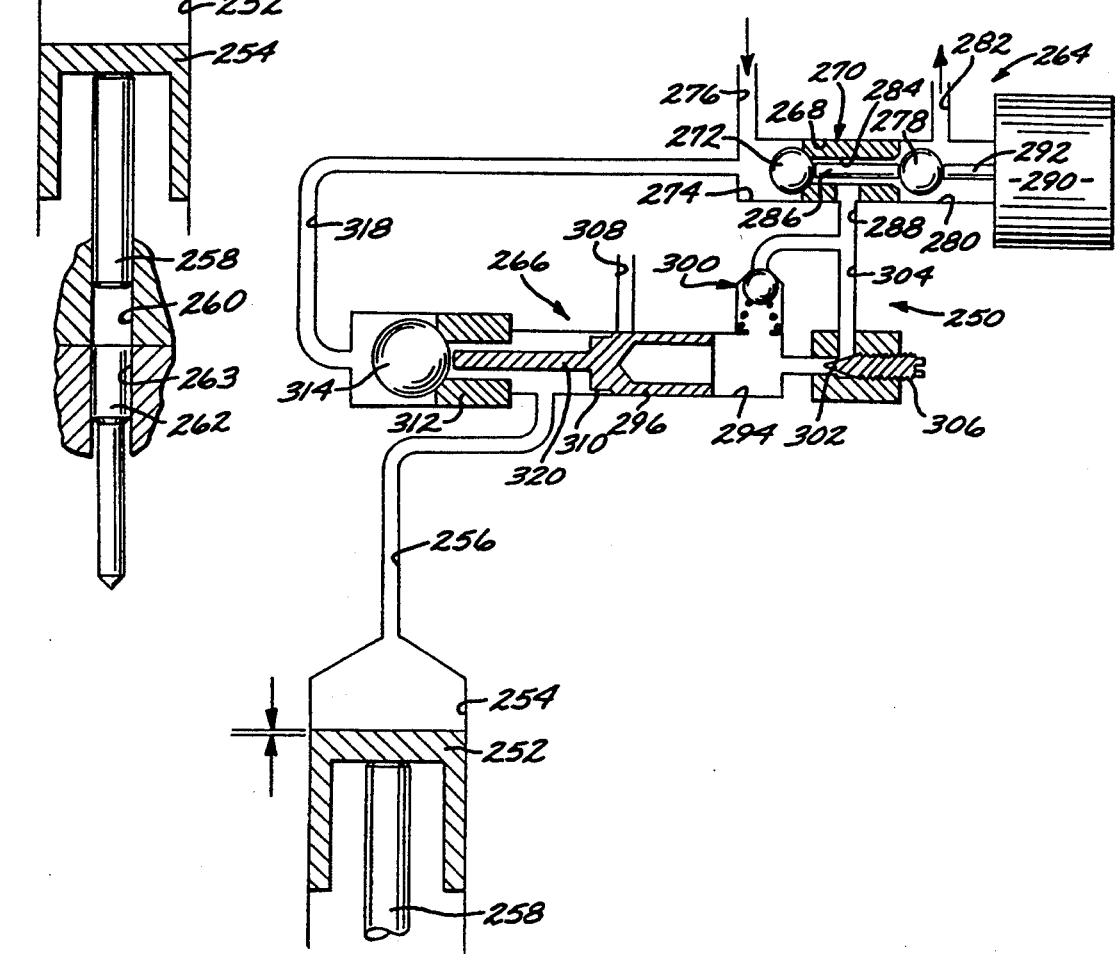
FIG. 19 is a view similar to FIG. 18, but with the solenoid valve deenergized to commence the injection event, and with the control piston partially retracted in a first stage needle prelift position.
Figure 20:
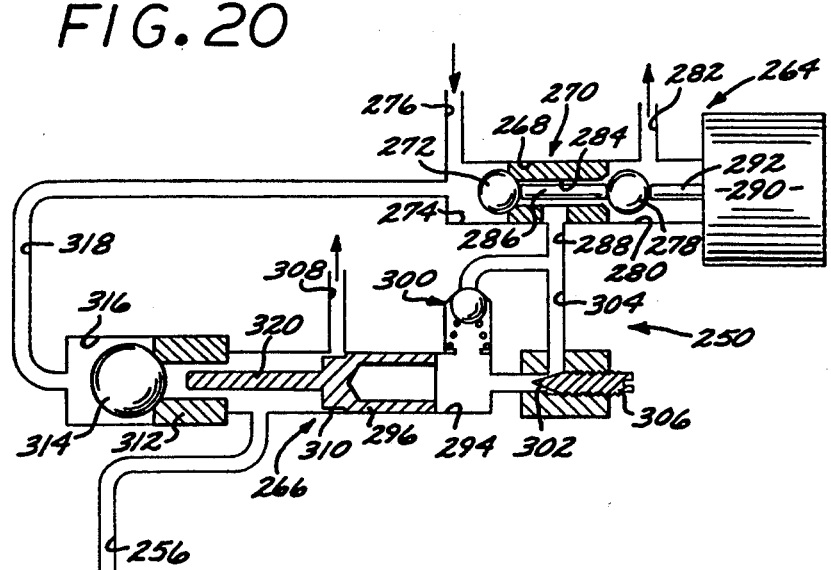
FIG. 20 is a view similar to FIGS. 18 and 19 with the control piston fully retracted in a second stage full needle lift position.

FIGS. 18, 19 and 20 diagrammatically illustrate another two-stage needle lift control system, generally designated 250 which is shown applied to an intensified accumulator injector. The needle lift control system 250 is in the form of a hydraulic circuit which produces two-stage venting from low pressure cylinder 252 above low pressure intensifier piston 254 through inlet/vent passage 256. This, in turn, produces a two-stage upward movement of high pressure intensifier piston 258 and consequent two-stage pressure relief in high pressure intensifier cylinder 260 causing a first, low-lift increment of movement of injector needle 262, and then in sequence the full lift movement of needle 262. Needle 262 is illustrated diagrammatically in FIG. 18 as a unitary needle structure axially slideable in guide bore 263. It is to be understood, however, that a divided needle may be employed as in the form of the invention illustrated in FIGS. 1-13. The intensified form of the invention employed in conjunction with the two-stage hydraulic lift control system 250 of FIGS. 18, 19 and 20 may be structurally and functionally like the intensified injector system of FIGS. 1-13, although it does not employ a needle stop and damping plate like plate 71 to produce the two-stage needle lift control.

FIG. 18 illustrates the needle lift control system 250 in an actuated condition for producing the intensification stroke, with rail pressure applied through inlet/vent passage 256 to low pressure cylinder 252, with both low pressure piston 254 and high pressure piston 258 at their lowermost positions and needle 262 closed. FIG. 19 illustrates the hydraulic circuit 250 in an unactuated, preliminary slow vent condition in which fluid pressure is slowly vented out of low pressure cylinder 254 through inlet/vent passage 256, with respective low and high pressure pistons 252 and 258 slightly raised to partially relieve pressure in high pressure cylinder 260 and thereby allow a preliminary low-lift increment of needle movement. FIG. 20 illustrates the hydraulic circuit 250 in an unactuated full vent condition in which fluid pressure is fully vented from low pressure cylinder 254 through inlet/vent passage 256, allowing full upward movement of the respective low and high pressure pistons 252 and 258, reducing the fluid pressure in high pressure intensification cylinder 260 sufficiently for full needle lift.

Referring to FIG. 18, the needle control system 250 has a its primary basis a tandem valve arrangement consisting of a high speed solenoid valve generally designated 264 and a control valve generally designated 266 which is actuated in response to actuation of solenoid valve 264. Solenoid valve 264 has a valve chamber 268 inside the body of the valve, with a valve seat cartridge 270 in chamber 268. A supply ball poppet 272 is located in supply chamber 274 defined in one end of the valve chamber 268, supply chamber 274 receiving fuel at rail pressure through a supply passage 276. A vent ball poppet 278 is located in vent chamber 280 defined in the other end of valve chamber 268, and is in communication with a vent passage 282 which communicates to a vent pressure which may be somewhat above atmospheric pressure, as for example about 30 psig, or may if desired be atmospheric pressure.

Valve seat cartridge 270 has an axial passage 284 therethrough which communicates with the seats for both balls 272 and 278. A ball separator pin 286 extends through passage 284 and holds balls 272 and 278 spaced apart greater than the spacing between the two valve seats, so that when either ball is seated it causes the other ball to become unseated. A control conduit 288 communicates with the cartridge passage 284, and hence with both of the valve seats. Solenoid 290 is axially aligned with balls 272 and 278 and the ball seats, and has an armature pin 292 which, in the energized condition of solenoid 290 illustrated in FIG. 18, closes vent ball 278 against its seat, which causes supply ball 272 to be unseated. In the deenergized condition of solenoid 290 as illustrated in both of FIGS. 19 and 20, vent ball 278 is released, enabling rail pressure fuel in supply chamber 274 to close supply ball 272 against it seat, which in turn causes vent ball 278 to be lifted off of its seat.

Control valve 266 has a cylinder 294 in its valve body, with a control piston 296 slideable in cylinder 294. A fuel supply conduit 298 communicates from solenoid valve control conduit 288 through a check valve 300 to cylinder 294 at the rear of piston 296. A variable bleed orifice 302 provides outlet communication from cylinder 294 behind piston 296 through an increment vent conduit 304 to the solenoid valve control conduit 288. Bleed orifice 302 may have manual adjustment means such as an adjustment needle 306 for adjusting the rate of bleed through orifice 302, or may have automatic adjustment means controlled according to the condition of engine operation. Bleed orifice 302 is adapted to allow pressurized liquid to slowly bleed from cylinder 294 behind piston 296 so as to allow slow retraction of piston 296.

A primary vent conduit 308 communicates with cylinder 294 but is completely blocked by piston 296 in the fully advanced, actuated position of piston 296 as seen in FIG. 18. Piston 296 has an annular relief or reduction 310 proximate the head of the piston, which is offset from the primary vent conduit 308 in the fully advanced position of piston 296 as shown in FIG. 18, but which shifts into registry with vent conduit 308 when piston 296 shifts to a retracted position as shown in FIG. 20. Piston head relief 310 may, if desired, be in the form of an annular array of axially directed bleed grooves. Inlet/vent passage 256 for low pressure intensifier cylinder 254 communicates with cylinder 294 forward of the head of piston 296 in all positions of piston 296, and is placed in fluid communication with primary vent conduit 308 when piston 296 retracts to a full vent position like that illustrated in FIG. 20.

A poppet valve is carried in the body of control valve 266 in axial alignment with cylinder 294 and piston 296, spaced forward of the head of piston 296. This poppet valve includes an annular valve seat member 312 and a ball poppet 314 carried in a high pressure ball chamber 316. Chamber 316 is provided with liquid fuel at rail pressure from supply passage 276 through a supply conduit 318. Ball 314 is normally held in a closed, seated position as shown in FIGS. 19 and 20 by rail pressure of fuel in ball chamber 316. A ball actuator pin 320 extending from the head of piston 296 is adapted to unseat ball 314 in the fully actuated, advanced position of piston 296 as shown in FIG. 18 to supply fuel at rail pressure through seat member 312, cylinder 294 and inlet/vent passage 256 to low pressure intensifier cylinder 252 to provide the intensification stroke.

In operation, the two-stage needle lift control system 250 of FIGS. 18–20 first produces an intensification stroke during which the accumulator is charged with fuel under intensified pressure, and the high fluid pressure in the high pressure intensification cylinder holds the needle down. Then, at the engine-programmed time for injection, the prelift or low-lift needle movement is caused to occur for injection of a pilot charge, and then in sequence full needle lift is effected for the main fuel charge.

This operational sequence of the control system 250 starts with the system in its fully relaxed condition illustrated in FIG. 20. In the condition of FIG. 20, solenoid 290 is unenergized, its armature pin 292 retracted to the right, supply ball 272 seated under the influence of fuel at rail pressure, and vent ball 278 unseated. Fuel pressure has been vented from cylinder 294 of control valve 266 through bleed orifice 302, increment vent conduit 304, control conduit 288, axial passage 284 of seat cartridge 270, and out past vent ball 278, its vent chamber 280 and vent passage 282. Such venting has caused control valve piston 296 to shift to the right to its full vent position in which pressurized fluid has been vented from low pressure intensifier cylinder 254 through inlet/vent passage 256, cylinder 296 and primary vent conduit 308, thus causing respective low and high pressure intensifier pistons 252 and 258 to be in their fully retracted or full lift positions, with injector needle 262 closed. Ball 314 of control valve 266 is seated, blocking rail pressure fuel from entering low pressure intensifier cylinder 254.

Energization of solenoid 290 shifts the control system 250 to its condition illustrated in FIG. 18. When solenoid 290 is energized, its armature pin 292 is extended, to the left as illustrated, seating vent ball 278 and unseating supply ball 272. Fuel at rail pressure passes into the system from supply passage 276 through supply ball chamber 274, past supply ball 272 through axial passage 284 of cartridge 270, and thence through control conduit 288, supply conduit 298 and past open check valve 300 into control valve cylinder 294, moving piston 296 to its fully advanced position, to the left as viewed. In this position, piston 296 closes off primary vent conduit 308 and unseats ball 314, allowing rail pressure fuel to pass from supply passage 276 through conduit 318, ball chamber 316, ball seat member 312, cylinder 294, and inlet/vent passage 256 into low pressure intensifier cylinder 252, producing the downward intensification stroke of intensifier pistons 254 and 258 and thereby charging the accumulator. The control System 250 has thus prepared the injector for an injection event, and as long as solenoid 290 is energized, the system will remain ready to effect the two-stage needle lift sequence.

The two-stage injection event is initiated by deenergization of solenoid 290, which instantaneously shifts solenoid valve 264 to its condition illustrated in FIG. 19, with supply ball 272 seated and vent ball 278 unseated. Check valve 300 is now seated, and the only escape path for fuel from control valve cylinder 294 behind piston 296 is through bleed orifice 302. At the instant solenoid 290 is deenergized, full rail pressure is present in cylinder 294 in front of piston 296, such pressure biasing piston 296 in the direction of retraction, to the right as viewed. Piston 296 now retracts to the right at a rate controlled by the variable bleed orifice 302, first allowing ball 314 to seat, and then enlarging the volume in cylinder 294 on the head side of piston 296, which reduces the fluid pressure in low pressure intensifier cylinder 254 and allows incremental upward movement of intensifier pistons 252 and 258, reducing the intensified pressure above the needle and causing the low-lift or prelift increment of needle lift for the pilot charge to be injected.

FIG. 19 illustrates the control system 250 in this low-lift or prelift condition, the space between the vertical arrows to the left of FIG. 19 illustrating the low-lift increment of movement of the intensifier pistons. The low-lift condition remains in effect as long as piston 296 blanks off primary vent conduit 308 as seen in FIG. 19, the time interval of the low-lift condition being determined by the rate at which fuel bleeds from behind piston 296 through variable bleed orifice 302. The main injection event commences when the reduced head portion 310 of piston 296 comes into registry with primary vent conduit 308 as piston 296 retracts from its position shown in FIG. 19 to its position shown in FIG. 20. The space between the vertical arrows to the left of the diagram of FIG. 20 illustrates the full lift increment of movement of the intensifier pistons.

While the two-stage needle lift hydraulic control system 250 of FIGS. 18–20 has been shown and described above applied to an intensified type accumulator injector, it is to be understood that it is equally applicable to an unintensified type accumulator injector, as for example the injector shown in FIGS. 14–17. Applying the system 250 of FIGS. 18–20 to injector 152 as seen in FIG. 14, inlet/vent passage 256 for the actuating fluid would be connected to inlet/vent passage 176 of unintensified injector 152. Then the hydraulic system 250 will apply the two-stage venting directly to spring cavity 218 and hence directly to the top of needle 204 so as to produce the two-stage needle lift.

Figure 22:
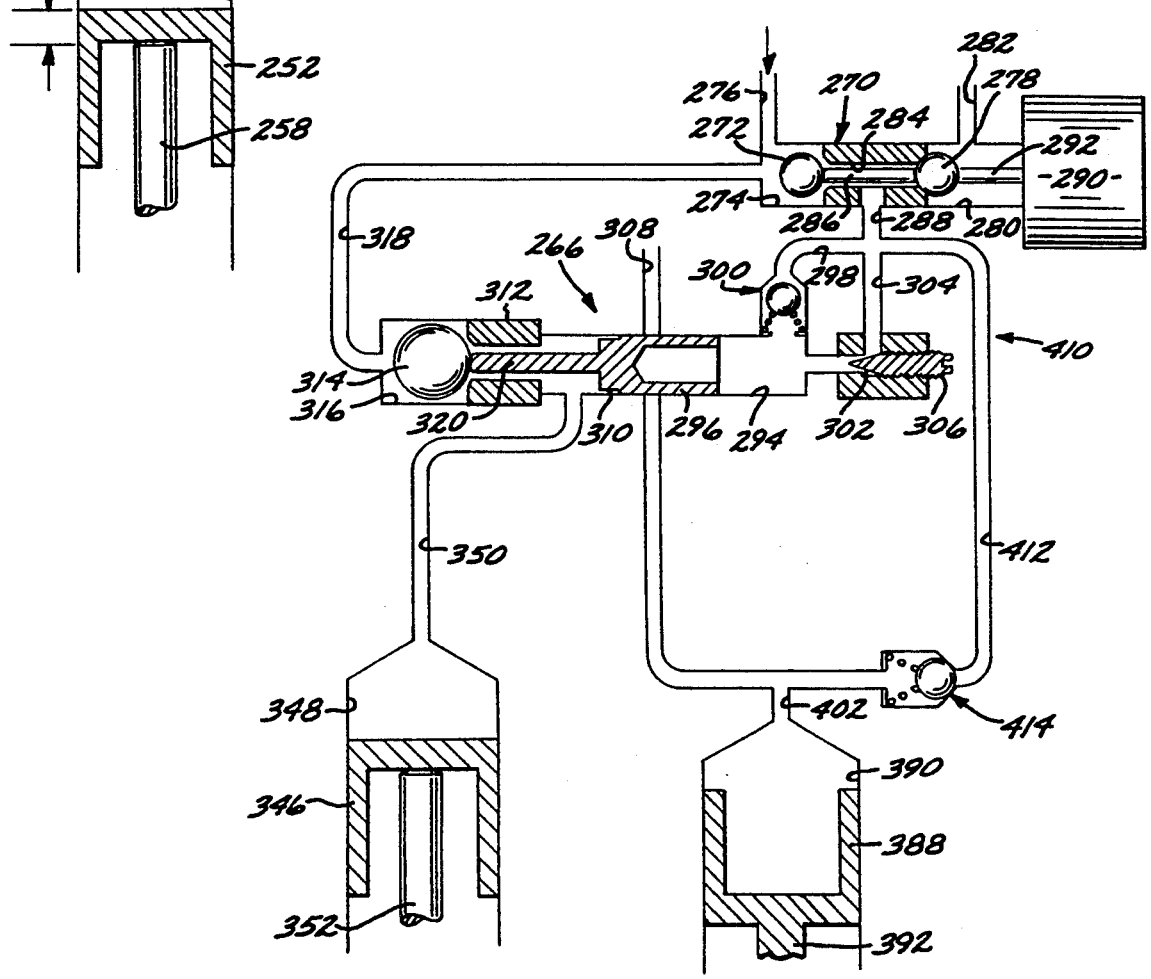
FIG. 22 is a diagrammatic illustration of a hydraulic circuit similar to that of FIGS. 18-20 but modified to control the positive stop piston in the injection of FIG. 21.
Figure 21:
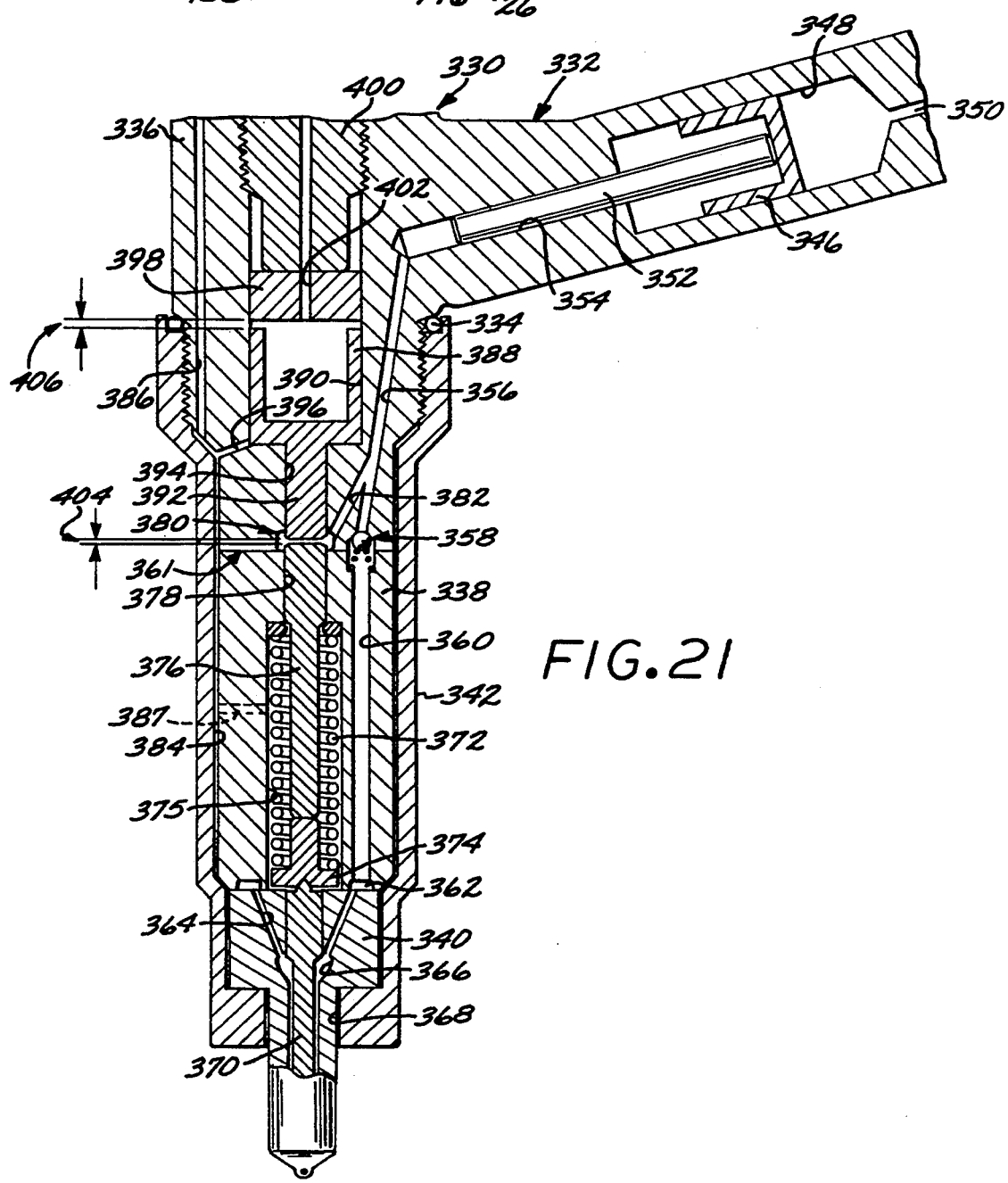
FIG. 21 is an axial, vertical section of an intensified injector embodying a positive stop piston for defining the needle prelift increment.

Another form of two-stage needle lift control system is shown in FIGS. 21 and 22, which has a hydraulic control circuit that is very similar to the hydraulic circuit of the form shown in FIGS. 18–20, but which incorporates a positive stop to accurately define the first increment of needle lift. The system of FIGS. 21 and 22 is also shown applied to an intensified form of accumulator injector. The control system of FIGS. 21 and 22 embodies a stop piston in axial alignment with the needle and its plunger, and has the intensifier offset to the side. This structural arrangement of the injector is illustrated in FIG. 21, which will first be described, while the implementing hydraulic circuit is diagrammatically illustrated in FIG. 22.

Referring to FIG. 21, the injector is generally designated 330, and has an upper body 332 with an intensifier portion 334 off to one side, and a stop piston portion 336 generally axially aligned with the injector needle. Axially aligned with and below stop piston body portion 336 is accumulator body 338, with a lapped seal therebetween. Nozzle body 340 defines the lower end portion of injector 330, and has a lapped seal fit against the lower end of accumulator body 338. The three bodies 332, 338 and 340 are clamped together by injector housing 342, with accumulator body 338 and nozzle body 340 seated within housing 342, and the stop piston portion 336 of upper body 332 threadedly coupled in the upper end of housing 342. An O-ring seal 344 is engaged between the top of housing 342 and upper body 332.

The intensifier portion 334 of injector 330 is only diagrammatically illustrated, and it is to be understood that it has components similar to those of the intensifier portion of injector 10 illustrated in FIGS. 1–13, and functions in essentially the same way. The intensifier portion 334 of injector 330 includes low pressure intensifier piston 346 slideable in low pressure cylinder 348, with inlet/vent passage 350 in communication with low pressure cylinder 348. High pressure intensifier piston 352 is slideable in high pressure cylinder 354.

An intensified pressure conduit 356 leads from the inner, lower end of high pressure cylinder 354 downwardly through stop piston body portion 336 to a check valve 358 which serves as the inlet to the primary accumulator cavity. Thus, intensified pressure conduit 356 delivers high pressure fuel through check valve 358 into a longitudinally arranged accumulator bore 360 in the same manner that intensified pressurized fuel in the first form of the invention is delivered through check valve 88 into accumulator bore 90 as seen in FIG. 4.

Below the interface 361 between the bottom of stop piston body portion 336 and the top of accumulator body 338, the structure and operation of injector 330 of FIG. 21 are essentially the same as they are in injector 10 of FIGS. 1–8 below the top surface 24 of its accumulator body 26. Minor variations will be noted below. Thus, the primary accumulator cavity of injector 330 consists of a series of accumulator bores like bore 360 peripherally spaced about accumulator body 338 which are in communication with each other through annular cavity 362 in the bottom of accumulator body 338. The primary accumulator cavity communicates from annular cavity 362 through passages 364 in nozzle body 340 to kidney cavity 366, and thence to needle cavity 368. Needle 370 is normally biased to its closed position by needle spring 372 and guide/damper 374 which are located in spring cavity 375.

Needle plunger 376 extends upwardly from guide/damper 374 through spring 372 and plunger guide bore 378 in the upper end portion of accumulator body 342. Needle plunger 376 has a sliding fluid-tight seal in its guide bore 378, and its upper end is exposed to a small annual intensifier cavity 380. Intensifier cavity 380 communicates through a passage 382 and high pressure conduit 356 to the high pressure intensifier cylinder 354.

A minor variation in injector 330 of FIG. 21 from injector 10 of FIGS. 1–13 is that a generally cylindrical annular clearance 384 is provided between the outer surface of accumulator body 338 and the inner surface of housing 342. This clearance 384 has an outward frustoconical flare at its upper end from which a vent passage 386 extends upwardly through stop piston body portion 336. Vent passage 386 is vented to a fuel supply source at relatively low pressure, as for example about 30 psig. Annular clearance 384 and vent passage 386 serve two functions. First, spring cavity 375 is filled with liquid fuel through a radial passage 387 from clearance 384 to cavity 375. Second, any leakage between the lapped interfaces between the stacked bodies will accumulate in the annular clearance 384 and be vented through vent passage 386.

A stop piston 388 is provided in injector 330 to positively define both the small incremental prelift of the needle and the extent of the full lift of the needle. Stop piston 388 is axially slideable a short distance in a cylinder 390 which is axially aligned with needle 370 and its plunger 376. Stop piston 388 has a downwardly extending coaxial rod or plunger portion 392 which is slideable with a fluid-tight seal in a bore 394. Although stop piston 388 and its plunger 392 are illustrated as an integral unit, they may if desired, be separate parts and will function as a unit. A generally radially oriented vent passage 396 provides pressure relief from the bottom of cylinder 390 to the annular clearance 384, and hence to vent passage 386.

Upward travel of stop piston 388 is limited by piston stop member 396 which is located by means of a threaded positioning plug 400. Positioning plug 400 may, if desired, be threadedly axially adjustable to adjust the axial position of piston stop member 398. Stop member 398 determines the uppermost limit of travel of stop piston 388, and consequently of needle 370 and its plunger 376, as will be discussed below. An inlet/vent passage 402 provides alternate rail pressure and vent communication through positioning plug 400 and stop member 398 to stop piston cylinder 390.

The small increment 404 of needle prelift for the pilot charge is defined by the space between the upper end of needle plunger 376 and the lower end of stop piston plunger 392 with needle 370 in its closed position and stop piston 388 in its lowermost position as these parts are illustrated in FIG. 21. This is the position of the parts after completion of an intensification stroke with injector 330 prepared for an injection event. At such time rail pressure is being applied both to low pressure intensifier piston 346 through inlet/vent passage 350 and to stop piston cylinder 390 through inlet/vent passage 402. At such time high intensified pressure is being applied from high pressure intensifier cylinder 354 through high pressure conduit 356 and passage 382 to the small intensifier cavity 380. The accumulator cavity is at intensified pressure, applied through check valve 358. Full intensification pressure within intensifier cavity 380 holds the needle down, the downward force of high intensification pressure in intensifier cavity 380 against needle plunger 376 plus the downward force of spring 372 on needle 370 being greater than the upward force of accumulator pressure on the needle.

An injection event is initiated by partial venting of pressure from low pressure intensifier cylinder 348 out through inlet/vent passage 350, as will be explained in connection with FIG. 22. Such initial partial venting of low pressure intensifier cylinder 348 is not accompanied by any venting from stop piston cylinder 390, which is maintained at rail pressure, Lowering of the intensifier pressure by partial retraction or backing off of the two intensifier pistons 346 and 352 will cause the intensified pressure within intensifier cavity 380 to be lowered sufficiently for the upward force of accumulator pressure on needle 370 to overcome the downward force of intensifier cavity pressure on piston plunger 376 and the downward force of spring 372, at which time needle 370 will shift upwardly in its small initial increment 404 of lift which is stopped when the upper end of needle plunger 376 engages the lower end of stop piston plunger 392. At this time the full rail pressure against stop piston 388 blocks further upward movement of the needle. The time interval during which the needle is at this small prelift increment is adjustable by the hydraulic circuit of FIG. 22, and at the end of this time interval rail pressure is vented from stop piston cylinder 390 through inlet/vent conduit 402, allowing the needle to move upwardly a further increment 406 to its fully opened position which is determined by engagement of the upper end of stop piston 388 against stop member 398. The main injection event then occurs, and ends when accumulator pressure drops sufficiently for needle spring 372 to close needle 370.

FIG. 22 illustrates a hydraulic circuit 410 for operating the positive stop injector of FIG. 21. The hydraulic circuit 410 of FIG. 22 is the same as the hydraulic circuit of FIGS. 18–20 except for the addition of circuit components associated with stop piston 388 and its cylinder 390 which provide the positive incremental prelift stop for the needle. These additional components include a stop cylinder feed passage 412 which connects to control conduit 288 and communicates through a check valve 414 to stop cylinder inlet/vent passage 402. Also added in the hydraulic circuit of FIG. 22 is a stop cylinder vent passage 416 which connects stop cylinder inlet/vent passage 402 to control valve cylinder 294 at the same axial position as primary vent conduit 308.

Energization of solenoid 290 produces the intensification stroke of intensifier pistons 346 and 352 by lifting supply ball 272 off of its seat, providing rail pressure fuel through passages 284, 288 and 298 past check valve 300 into control valve cylinder 294 to extend control piston 296 to its fullest extent to the left as viewed in FIG. 22. In this position of piston 296, its ball actuator pin 320 lifts ball 314 off of its seat, admitting rail pressure fuel through conduits 276 and 318, chamber 316, valve seat 312, cylinder 294, and inlet/vent passage 350 to low pressure intensifier cylinder 348.

Simultaneously with pressurization of the intensifier cavity 380, rail pressure fuel is provided to stop piston cylinder 390 to place stop piston 388 in its positive stop position illustrated in FIG. 21. Such rail pressure fuel is provided from supply conduit 276 through chamber 274, conduits 284, 288 and 412, check valve 414, and stop cylinder inlet/vent passage 402.

Initiation of the two-stage injection event is caused by deenergization of solenoid 290, which causes solenoid valve supply ball 272 to seat and vent ball 278 to become unseated. The first, small increment stage of needle lift is produced by the hydraulic circuit 410 of FIG. 22 in the same way as it was produced in the hydraulic circuit 250 of FIGS. 18–20, except for the positive limitation placed on the first-stage needle lift by stop piston 388. Thus, upon deenergization of solenoid 290, control valve piston 296 slowly retracts to the right in FIG. 22 as fuel in cylinder 294 behind piston 296 bleeds out through bleed orifice 302, passages 304, 288 and 284, vent chamber 280, and vent passage 282. Such retracting movement of piston 296 lowers the pressure on its head side which lowers the pressure in low pressure intensifier cylinder 348 via inlet/vent passage 350, allowing intensifier pistons 346 and 352 to partially retract. When such partial retraction is sufficient, lowered pressure in intensifier cavity 380 of FIG. 21 will allow the needle to lift in its small first-stage increment which is positively defined by abutment of the needle plunger 376 against stop piston plunger 392. At this time the full rail pressure is maintained in stop piston cylinder 390 because stop cylinder vent passage 416 is closed off by control valve piston 296 and stop cylinder feed passage check valve 414 is closed.

As control piston 296 continues to retract to the right in FIG. 22 because of fuel bleeding through orifice 302, the piston's reduced head portion 310 comes into registry with both primary vent conduit 308 and stop cylinder vent passage 416 at the same time, whereby low pressure intensifier cylinder 348 and stop piston cylinder 390 are simultaneously vented through control cylinder 294 and primary vent conduit 308. This simultaneously removes the two barriers of high intensification pressure and stop piston 388 from above needle plunger 376, allowing full lift of the needle.

Figure 23:
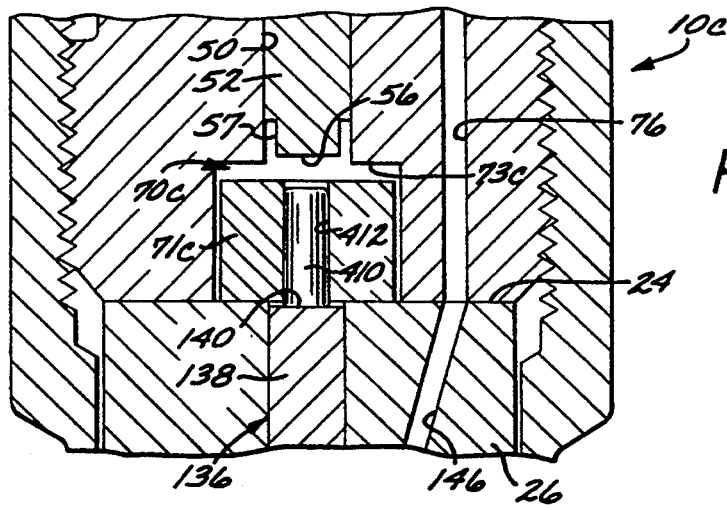
FIG. 23 is a view similar to FIGS. 9 and 10, in which the damping plate or member has an axial passage with a slideable pin therein.

FIG. 23 illustrates a further modified intensified form of the invention generally designated 10c which utilizes a needle stop and damping plate or member to accomplish the two-stage needle lift in a manner similar to the forms of the invention shown in FIGS. 8, 9 and 10. However, in the form shown in FIG. 23, stop plate member 71c has a lap-fitted pin 410 axially slideable with a fluid-tight seal in an axial bore 412 through stop member 71c. As with the stop plates in the forms shown in FIGS. 8, 9 and 10, stop member 71c has its bottom surface sealingly lap-fitted to a shoulder formed by the top surface 24 of accumulator body 26. With this construction, intensified pressure from damper cavity 70c is not directly transmitted through a hole in the stop plate or member as in the other forms, and the needle holddown force prior to the injection event is provided by intensified fluid pressure against the top of pin 410. This arrangement minimizes the possibility of intensified pressurized fluid getting underneath stop member 71c during the first, prelift stage of needle movement to assure against premature ending of the first stage needle lift event.

As with the form of the invention shown in FIG. 8, the upper end 140 of needle plunger 136 is offset below the upper surface 24 of accumulator body 26 in the closed position of the needle. The amount of this offset clearance determines the extent of the small initial needle lift to provide the pilot charge.

When high pressure intensifier piston 52 starts to retract at the beginning of an injection event, lowered fluid pressure within damper cavity 70c enables the upward force of accumulator fluid pressure on the needle to overcome the downward forces of the needle spring and fluid pressure on pin 410 to allow the prelift increment of needle movement to occur. Such first-stage needle movement is stopped by abutment of the upper end 140 of needle plunger 136 against the bottom surface of stop member or plate 71c. At this time, the downward force of fluid pressure in damper cavity 70c against stop member 71c and its pin 410 plus the downward force of the needle spring are still greater than the upward force of accumulator fluid pressure on the needle, to effect the positive stop of needle plunger 136 against seated stop member 71c. As intensifier piston 52 further retracts upwardly to further reduce the fluid pressure in damper cavity 70c, the upward force of accumulator fluid pressure against the needle will, in sequence, overcome the downward forces of fluid pressure against stop member 71c and its pin 410 and of the needle spring, to enable needle plunger 136 to unseat stop member 71c and allow the needle to move to its fully opened position which is defined by engagement of the upper surface of stop member 71c against stop shoulder 73c at the top of damper cavity 70c.

While the present invention has been described with regard to particular embodiments, it is to be understood that modifications may readily be made by those skilled in the art, and it is intended that the claims cover any such modifications which fall within the scope and spirit of the invention as set forth in the appended claims.

We claim:

1. A method of reducing undesired premixed burning in an internal combustion engine, comprising:
   A. lifting an injector needle of a fuel injector a constant low-lift increment from a valve seat of said fuel injector; then
   B. preventing lifting of said needle beyond said low-lift increment for a sufficient interval of time to inject a relatively small initial fuel charge into the engine, said interval terminating when lifting forces imposed on said needle overcome holding forces imposed on said needle by a stop plate, said stop plate having opposed first and second surfaces exposed to an ambient fluid pressure and to a fluid vapor pressure, respectively; and then
   C. lifting said needle to a higher lift position to inject a main fuel charge into the engine.

2. A method as defined in claim 1, wherein said fuel injector is a pressure intensified-type fuel injector, and wherein said ambient fluid pressure comprises intensified fluid pressure.

3. A method as defined in claim 2, wherein said intensified fluid pressure is imposed on said needle through a hole formed in said stop plate.

4. A method as defined in claim 1, wherein said preventing step commences when said needle abuts said stop plate and terminates when said stop plate lifts with said needle.

5. A method as defined in claim 4, wherein said fluid vapor pressure is formed from an essentially fluid-tight seal formed by the seating of said stop plate onto a mating flat stationary member, and wherein, when said stop plate is lifted, said seal is broken and fluid pressure at the interface between said stop plate and said stationary member increases from said fluid vapor pressure to said ambient pressure.

6. A fuel injector for an internal combustion engine comprising:
   A. an injector body;
   B. a nozzle provided on said injector body and defining an injector needle valve seat;
   C. an injector needle slidably received in said injector body and being normally seated on said valve seat; and
   D. a stop plate disposed in said injector body and being normally positioned so as to have opposed first and second surfaces thereof exposed to an ambient fluid pressure and to a fluid vapor pressure, respectively.

7. A fuel injector as defined in claim 6, wherein said second surface of said stop plate comprises a downwardly facing flat and smooth surface which is normally seated on a flat and smooth shoulder of said injector body so as to provide an essentially fluid-tight seal therebetween.

8. A fuel injector as defined by claim 7, wherein an axial clearance is formed between said stop plate and an upwardly facing surface of said injector needle when said injector needle is seated on said valve seat, said injector needle closing said clearance to abut said stop plate upon being lifted from said valve seat.

9. A fuel injector as defined in claim 8, wherein said downwardly facing surface of said stop plate has a recess formed therein the depth of which substantially defines said axial clearance, said upwardly facing surface of said injector needle entering said recess when said injector needle rises from its seated position.

10. A fuel injector as defined in claim 8, wherein said stop plate has an axial hole formed therethrough via which said ambient fluid pressure is imposed on said upwardly facing surface of said injector needle.

11. A fuel injector as defined in claim 10, further comprising a pin extending through said hole and abutting said upwardly facing surface of said injector needle.

12. A fuel injector as defined in claim 11, wherein said pin has an upper end positioned in a cavity containing pressurized fluid.

13. A fuel injector as defined in claim 18, wherein said ambient fluid pressure biases said injector needle towards said valve seat, and further comprising a needle spring which biases said injector needle towards said valve seat and a plate spring which biases said stop plate towards said shoulder of said injector body.

14. A fuel injector as defined in claim 6, wherein said fuel injector is an accumulator-type fuel injector in which the energy for injection is stored by the compression of liquid fuel within said injector.

15. A fuel injector as defined in claim 6, wherein said fuel injector is a pressure intensified-type fuel injector having a cavity exposed to intensified fluid pressure, and wherein said stop plate is provided in said cavity.

16. A fuel injector as defined in claim 6, wherein said injector needle comprises a unitary injector needle.

17. A fuel injector as defined in claim 6, wherein said injector needle comprises a two-part injector needle.

18. A fuel injector as defined in claim 6, wherein said nozzle is a sac nozzle.

19. A fuel injector as defined in claim 6, wherein said nozzle is a pintle type nozzle.

20. A method of reducing undesirable premixed burning in an internal combustion engine, comprising
   A. raising an injector needle of an accumulator-type fuel injector off its valve seat a small constant low-lift increment for a sufficient interval of time to inject a small initial fuel charge into the engine; and then
   B. raising the needle to a higher lift position to inject a main fuel charge into the engine.

21. A fuel injector comprising:
   A. an injector body having
      (1) a longitudinal bore formed therein,
      (2) a nozzle formed in a bottom end of said bore and defining a needle valve seat, and
      (3) a pressurized cavity formed therein located above and in communication with an upper end of said bore;
   B. an injector needle slidably received in said bore and having a lower end normally seated on said valve seat and an upper end normally disposed proximate a junction between said pressurized cavity and said bore; and
   C. a stop plate disposed in said pressurized cavity and having
      (1) an upper surface exposed to an ambient fluid pressure in said cavity, (2) a lower surface sealingly contacting a shoulder of said injector body, and (3) a hole formed therethrough permitting the imposition of forces, generated by said ambient fluid pressure in said pressurized cavity, on said upper end of said injector needle.

22. A fuel injector as defined in claim 21, wherein said stop plate has a recess formed in said lower surface thereof for receiving said upper end of said injector needle when said injector needle is lifted from said valve seat.

23. A fuel injector as defined in claim 21, wherein said ambient fluid pressure biases said injector needle towards said valve seat, and further comprising a needle spring which biases said injector needle towards said valve seat and a plate spring which biases said stop plate towards said shoulder of said injector body.

24. A fuel injector as defined in claim 21, further comprising a pin extending through said hole of said stop plate and abutting said upper end of said injector needle.

25. A fuel injector as defined in claim 21, wherein said hole in said stop plate defines a fluid flow path between said upper end of said injector needle and said pressurized cavity.

26. A fuel injector as defined in claim 21, wherein
  A. the pressure at an interface between said lower surface of said stop plate and said shoulder of said injector body is approximately fluid vapor pressure, and
  B. the net pressure forces on said stop plate are the product of 1) the interface area and 2) the difference between an ambient pressure in said pressurized cavity and said vapor pressure.

27. A method of reducing undesired premixed burning of fuel in an internal combustion engine, comprising:
  A. first injecting a small initial charge of fuel from an accumulator-type fuel injector into said engine at a relatively low rate, said initial fuel charge being injected through a relatively small substantially constant needle aperture for a first time interval; and then
  B. injecting a main fuel charge into said engine at a relatively high rate which gradually decreases from an initial peak rate, said main fuel charge being injected through a relatively large substantially constant needle valve aperture for a second time interval, said relatively high rate of injection decreasing during said second time interval.

28. In an internal combustion engine accumulator-type fuel injector, a method of reducing undesirable premixed burning in the engine which comprises:
  A. raising an injector needle off its valve seat a small low-lift increment for a sufficient interval of time to inject a small initial fuel charge into the engine;
  B. then lifting the needle to a full lift position to inject the main fuel charge into the engine; and
  C. controlling needle lift by controlled venting of pressurized liquid from a pressurized zone located above said needle.

29. A method as defined in claim 28, wherein said step of controlling comprises:
  A. first relatively slowly venting pressurized liquid from said pressurized zone to produce said low-lift increment of lift of said injector needle; and
  B. then relatively rapidly venting pressurized liquid from said pressurized zone to produce said raising of said injector needle to its said full lift position.

30. A method as defined in claim 29, further comprising:
  A. placing a stop plate at a first stop position in which it is spaced said low-lift increment above the upper end of said injector needle prior to said relatively slow venting so as to positively stop said injector needle at its said low-lift increment of lift during said relatively slow venting; and
  B. releasing said stop plate from its first stop position during said relatively rapid venting so as to enable said injector needle to lift to its said full lift position.

31. A method as defined in claim 30, wherein said step of releasing said stop plate enables said stop plate to be raised to a second stop position during said relatively rapid venting so as to positively stop said injector needle at its said full lift position.

32. A method as defined in claim 31, further comprising:
  A. holding said stop plate in its said first stop position by fluid pressure during said relatively slow venting; and
  B. decreasing said fluid pressure so as to perform said releasing of said stop plate.

33. A method as defined in claim 28, wherein said controlling step comprises controlled venting of pressurized liquid from said pressurized zone so as to provide an injection rate which increases with time.

34. A method as defined in claim 28, wherein said controlling step comprises controlled venting of pressurized liquid from said pressurized zone so as to provide an injection rate which increases with time followed by an injection rate which decreases with time.

* * * * *

UNITED STATES PATENT AND TRADEMARK OFFICE
CERTIFICATE OF CORRECTION

PATENT NO. : 5,341,783
DATED : Aug. 30, 1994
INVENTOR(S) : Beck et al.

It is certified that error appears in the above-indentified patent and that said Letters Patent is hereby corrected as shown below:

On the title page, under "Notice:", it should read as follows:

The portion of the term of this patent subsequent to September 7, 2010 has been disclaimed.

Signed and Sealed this

Twenty-second Day of August, 1995

Attest:

BRUCE LEHMAN

*Attesting Officer*  *Commissioner of Patents and Trademarks*